I

US008130423B2

(12) United States Patent  (10) Patent No.: US 8,130,423 B2
Nakano et al. (45) Date of Patent: Mar. 6, 2012

(54) IMAGE SCANNING DEVICE AND METHOD FOR DETECTING TYPE OF DOCUMENT

(75) Inventors: Keiichi Nakano, Aichi (JP); Takahiro Ikeno, Aichi (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 988 days.

(21) Appl. No.: 11/945,560

(22) Filed: Nov. 27, 2007

(65) Prior Publication Data
US 2008/0123163 A1 May 29, 2008

(30) Foreign Application Priority Data
Nov. 27, 2006 (JP) .................................. 2006318982

(51) Int. Cl.
H04N 1/04 (2006.01)
(52) U.S. Cl. ........ 358/474; 358/498; 358/475; 358/509; 382/313; 382/275; 399/341; 399/376
(58) Field of Classification Search .................. 358/498, 358/474, 475, 509, 487, 488, 501, 497, 496, 358/486, 440; 382/313, 254, 275; 399/341, 399/342, 376, 367, 66, 49
See application file for complete search history.

(56) References Cited

U.S. PATENT DOCUMENTS
4,829,371 A   5/1989 Hiramatsu et al.
5,513,017 A * 4/1996 Knodt et al. .................. 358/471

6,252,684 B1 * 6/2001 Lin ................................ 358/498
(Continued)

FOREIGN PATENT DOCUMENTS
JP  H03-250967 A  11/1991
(Continued)

OTHER PUBLICATIONS
European Patent Office, Partial European Search Report dated Dec. 4, 2008 in counterpart Patent Application No. EP 07254593.
(Continued)

*Primary Examiner* — Negussie Worku
(74) *Attorney, Agent, or Firm* — Baker Botts L.L.P.

(57) ABSTRACT

An image scanning device for scanning an image on a document comprises a document table on which a document to be scanned is placed, a scanning unit which is installed in the document table for scanning an image on a document by projecting light from a light source onto the document in a time-sharing manner and detecting reflected light from the document, a moving unit which moves at least one of the document and the scanning unit to let them move relatively with each other, and a document type judgment unit which judges the type of the document in regard to transmission of light through the document based on a non-lighting period image signal which is outputted by the scanning unit by scanning the document for one line in a main scanning direction in a non-lighting period of the light source.

20 Claims, 12 Drawing Sheets

U.S. PATENT DOCUMENTS

| | | | |
|---|---|---|---|
| 6,259,540 | B1 | 7/2001 | Hsu et al. |
| 6,386,711 | B1* | 5/2002 | Petruchik et al. ............. 353/122 |
| 6,417,937 | B1* | 7/2002 | Batten et al. .................. 358/487 |
| 6,445,480 | B1* | 9/2002 | Huang et al. ................ 359/196.1 |
| 6,744,541 | B1* | 6/2004 | Lu .................................. 358/497 |
| 6,906,830 | B1* | 6/2005 | Hayashi ......................... 358/474 |
| 6,980,332 | B2* | 12/2005 | Simske .......................... 358/445 |
| 7,580,562 | B2* | 8/2009 | Yamada ......................... 382/165 |
| 7,603,536 | B2* | 10/2009 | Yokochi et al. ............... 711/169 |
| 7,652,801 | B2* | 1/2010 | Haas et al. .................... 358/474 |
| 7,667,879 | B2* | 2/2010 | Makino et al. ................ 358/498 |
| 7,672,533 | B2* | 3/2010 | Yamada ......................... 382/274 |
| 7,746,522 | B2* | 6/2010 | Oguri et al. ................... 358/497 |
| 7,755,804 | B2* | 7/2010 | Ikeno et al. ................... 358/461 |
| 7,773,270 | B2* | 8/2010 | Haas et al. .................... 358/474 |
| 7,907,310 | B2* | 3/2011 | Wang ............................. 358/474 |
| 2001/0035987 | A1 | 11/2001 | Ishido et al. |
| 2002/0039207 | A1* | 4/2002 | Kanda ............................ 358/498 |
| 2002/0196479 | A1* | 12/2002 | Simske .......................... 358/474 |
| 2003/0002090 | A1 | 1/2003 | Clifton |
| 2003/0025092 | A1* | 2/2003 | Barnes ..................... 250/559.27 |
| 2003/0231358 | A1* | 12/2003 | Haas et al. .................... 358/474 |
| 2004/0012825 | A1* | 1/2004 | Tesavis ......................... 358/474 |
| 2004/0119417 | A1 | 6/2004 | Hsu |
| 2004/0165233 | A1* | 8/2004 | Wang ............................. 358/505 |
| 2005/0029352 | A1 | 2/2005 | Spears |
| 2005/0128536 | A1* | 6/2005 | Yamanaka et al. ............ 358/488 |
| 2005/0270591 | A1* | 12/2005 | Haas et al. .................... 358/474 |
| 2006/0028696 | A1* | 2/2006 | Michiie et al. ................ 358/474 |
| 2006/0028698 | A1* | 2/2006 | Chen et al. .................... 358/498 |
| 2006/0245013 | A1* | 11/2006 | Ikeno et al. ................... 358/487 |
| 2006/0274688 | A1* | 12/2006 | Maxwell et al. .............. 370/328 |
| 2007/0001015 | A1* | 1/2007 | Suzuki et al. ............ 235/472.02 |
| 2007/0035788 | A1* | 2/2007 | Fang ............................. 358/487 |
| 2007/0273935 | A1* | 11/2007 | Ide et al. ....................... 358/474 |
| 2007/0285739 | A1 | 12/2007 | Nakano et al. |
| 2008/0123163 | A1* | 5/2008 | Nakano et al. ................ 358/498 |
| 2008/0151331 | A1* | 6/2008 | Osakabe ........................ 358/498 |

FOREIGN PATENT DOCUMENTS

| | | | |
|---|---|---|---|
| JP | 0570958 | A | 11/1993 |
| JP | H08-237441 | A | 9/1996 |
| JP | H10-154221 | A | 6/1998 |
| JP | 2000-207533 | A | 7/2000 |
| JP | 2001293919 | A | 10/2001 |
| JP | 2001301279 | A | 10/2001 |
| JP | 2001328258 | A | 11/2001 |
| JP | 2002185796 | A | 6/2002 |
| JP | 2003118095 | A | 4/2003 |
| JP | 2003312882 | A | 11/2003 |
| JP | 2003335429 | A | 11/2003 |
| JP | 2005-065276 | A | 3/2005 |
| JP | 2007-028413 | A | 2/2007 |

OTHER PUBLICATIONS

European Patent Office, Partial European Search Report dated Dec. 4, 2008 in counterpart Patent Application No. EP 07254593.2.

European Patent Office; Office Action in the European Patent Application No. 07254593.2 (counterpart to the above captioned US application) mailed May 20, 2010.

Japan Patent Office, Notification of Reasons for Rejection for Japanese Patent Application No. 2007-281236 (counterpart to above-captioned patent application), dispatched Jul. 12, 2011.

* cited by examiner

IMAGE SCANNING DEVICE AND METHOD FOR DETECTING TYPE OF DOCUMENT

CROSS-REFERENCE TO RELATED APPLICATION

This application claims priority under 35 U.S.C. §119 from Japanese Patent Application No. 2006-318982, filed on Nov. 27, 2006. The entire subject matter of the application is incorporated herein by reference.

BACKGROUND

1. Technical Field

Aspects of the present invention relate to an image scanning device for scanning an image on a document.

2. Related Art

An image scanning device of the so-called "flat bed" type is generally equipped with an image sensor such as a CIS (Contact Image Sensor) moving to and fro along the platen glass. When a document is placed on the platen glass of such an image scanning device and an instruction for starting the scanning of the document is inputted by the user, the image on the document is optically scanned by the CIS during the movement of the CIS. The scanned image of the document is outputted from the CIS as an image signal (electric signal).

Incidentally, the scanning of a thick document (e.g. book) is usually carried out with the document cover of the image scanning device open, and thus external light can enter the document table (in which the CIS is installed) through the platen glass during the scanning of a thick document. In such document scanning with external light entering the document table, the CIS receives not only reflected light from the document but also the entering external light. Since the signal level of the image signal outputted by the CIS becomes higher compared to cases where no external light enters the document table, the scanned image outputted by the CIS becomes a whity image.

In order to resolve the above problem, a digital copier capable of correcting an image signal deteriorated by the entrance of external light has been devised, as disclosed in Japanese Patent Provisional Publication No. 2002-185796 (hereinafter referred to as JP2002-185796A), for example. The digital copier disclosed in JP2002-185796A is equipped with a light amount sensor which is placed outside the platen glass (the top of the document table to be covered by the document cover). In this digital copier, the light amount of the external light (which is substantially proportional to the degree of opening of the document cover) is detected by the light amount sensor and conditions of image processing executed to the scanned image signal are changed depending on the light amount detected by the light amount sensor, by which the correction of the output image based on the light amount detected by the light amount sensor is carried out.

Another configuration described in JP2002-185796A employs an extending part of an elongated CCD (extending in the main scanning direction to the outside of the document scanning area) in place of the light amount sensor. With this configuration, the light amount of the external light can be detected without the need of providing a sensor specifically for the detection of the external light.

However, the image correction employed by the digital copier of JP2002-185796A involves the following problem. When a document that does not let through light (book, booklet, etc.) is placed on the platen glass, the external light enters the document table through areas of the platen glass at both edges of the document in the main scanning direction. In this case, within the whole image signal obtained by the document scanning, only parts of the signal corresponding to both edges of the document in the main scanning direction are affected by the external light. On the other hand, when a document that lets through light (thin paper, transparent document, etc.) is placed on the platen glass, the external light enters the document table uniformly through all parts of the document. In this case, the whole image signal obtained by the document scanning is affected by the external light. The digital copier of JP2002-185796A, making the same image correction irrespective of the type of the document (document type) is incapable of carrying out optimum image correction for the removal of the effect of external light from the image signal obtained by the document scanning.

SUMMARY

Aspects of the present invention are advantageous in that an image scanning device, capable of judging the type of the document so that proper execution of the correction process for removing the effect of external light from the image signal (obtained by scanning an image on a document) depending on the type of the document can be realized, can be provided.

In accordance with an aspect of the present invention, there is provided an image scanning device for scanning an image on a document, comprising: a document table on which a document to be scanned is placed; a scanning unit configured to scan an image on a document by projecting light from a light source onto the document in a time-sharing manner and to detect reflected light from the document; a moving unit which moves at least one of the document and the scanning unit to let them move relatively with each other; and a document type judgment unit which judges the type of the document in regard to transmission of light through the document based on a non-lighting period image signal which is outputted by the scanning unit by scanning the document for one line in a main scanning direction in a non-lighting period of the light source.

In the above image scanning device, the document scanning by the scanning unit is executed during the process for moving the document and the scanning unit relatively with each other. In the document scanning operation, light is projected from the light source onto the document and the reflected light from the document is detected by the scanning unit. Since the light source is lighted in the time-sharing manner in the scanning operation, there exists a non-lighting period as an interval between lighting periods of the light source. In the non-lighting period, the non-lighting period image signal (obtained by scanning the document for one line in the main scanning direction without lighting the light source) is outputted by the scanning unit. Thus, the intensity of the non-lighting period image signal substantially equals the black level if no external light is entering the document table. If some external light is entering the document table, the non-lighting period image signal has intensity corresponding to that of the entering external light.

Specifically, when a document not letting through light (book, booklet, etc.) is scanned, no external light passes through the document. On the other hand, when a document letting through light (thin paper, transparent sheet, etc.) is scanned, external light uniformly passes through all parts of the document. The type of the document in regard to the transmission of light through the document is judged by the document type judgment unit based on the non-lighting period image signal, by use of the difference in the signal waveform of the non-lighting period image signal depending on the type of the document.

With the image scanning device configured as above, the type of the document in regard to the transmission of light through the document is judged based on the non-lighting period image signal which is obtained by scanning the document for one line in the main scanning direction in the non-lighting period of the light source. Therefore, it becomes possible to execute the correction process (for removing the effect of external light from the image signal obtained by scanning the image on the document) properly depending on the type of the document.

According to another aspect of the invention, there is provided a method of detecting a type of a document. The method comprising the steps of: controlling a light source and a scanner to obtain a signal representing a scanned image when no light is emitted from the light source; and judging the type of the document by detecting transparency of the document based on distribution of a signal level of the signal representing the scanned image.

With this configuration, the type of the document in regard to the transmission of light through the document is judged based on the image signal which is obtained by scanning the document when no light is emitted by the light source. Therefore, it becomes possible to execute the correction process (for removing the effect of external light from the image signal obtained by scanning the image on the document) properly depending on the type of the document.

According to another aspect of the invention, there is provided an image scanning device for scanning an image on a document. The image scanning device comprises a document table on which a document to be scanned is placed, a scanning unit configured to scan an image on a document by projecting light from a light source onto the document and to detect reflected light from the document, a moving unit which moves at least one of the document and the scanning unit to let them move relatively with each other, and a first correction unit which controls a correction process for removing effect of external light from a first image signal which is outputted by the scanning unit by scanning the document when light is projected by the light source, in accordance with a second image signal which is outputted by the scanning unit by scanning the document for one line in a main scanning direction when light is not projected by the light source.

Such a configuration makes it possible to properly execute the correction process for removing the effect of external light from the image signal obtained by scanning the image on the document, depending on the second image signal obtained when light is not projected by the light source.

BRIEF DESCRIPTION OF THE ACCOMPANYING DRAWINGS

FIGS. 12A and 12B are graphs for explaining a process for modifying white reference data stored in a RAM of the scanner, wherein FIG. 12A shows a case where a "first-type document" is placed on the platen glass and FIG. 12B shows a case where a "second-type document" is placed on the platen glass.

DETAILED DESCRIPTION

Figure 1:
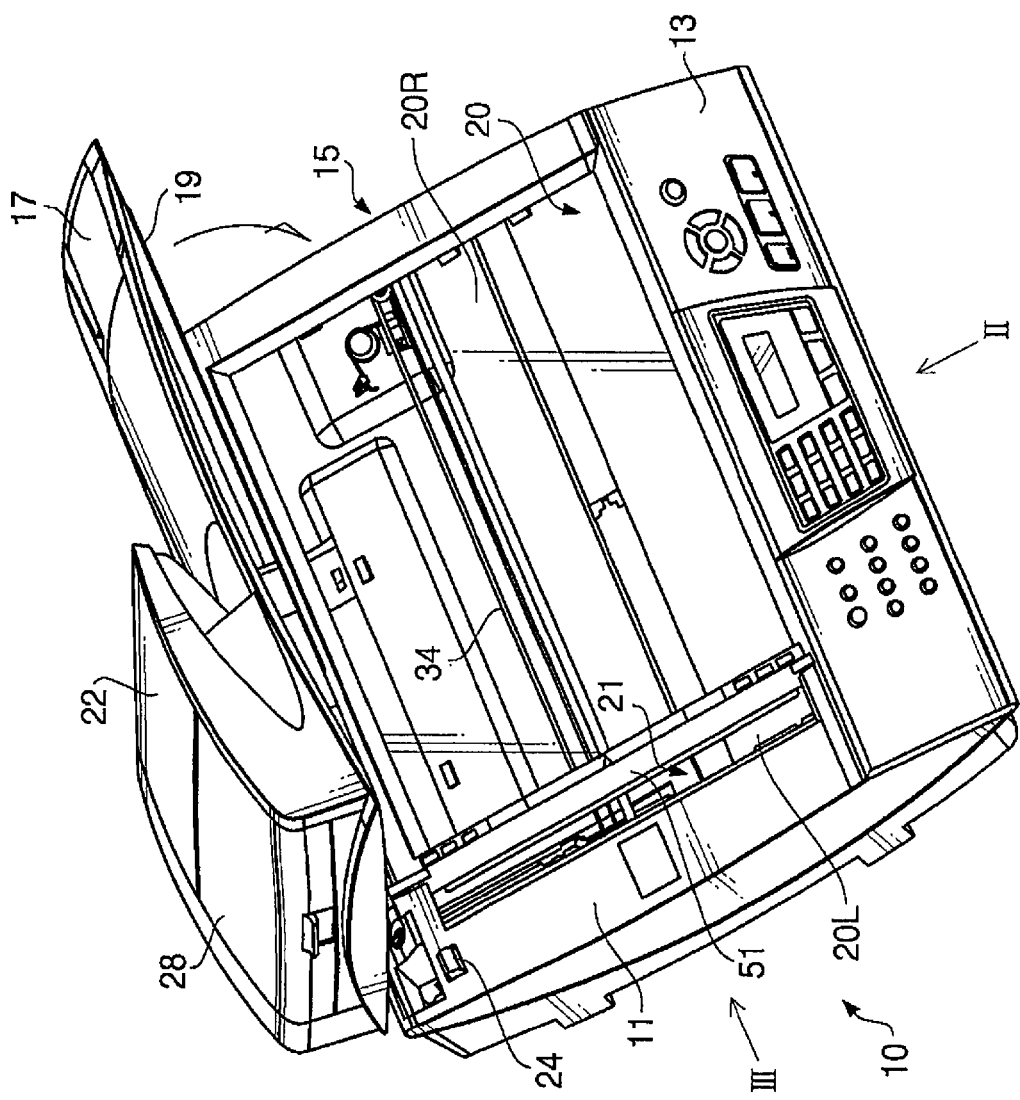
FIG. 1 is a perspective view showing external appearance of a scanner (with its document cover opened) as an image scanning device in accordance with an embodiment of the present invention.

Referring now to the drawings, a description will be given in detail of a preferred embodiment in accordance with the present invention.

First, the configuration and operation of a scanner 10 as an image scanning device in accordance with an embodiment of the present invention will be described. FIG. 1 is a perspective view showing external appearance of the scanner 10 with its document cover 17 opened.

The scanner 10, having the so-called scanner function (scanning an image on a document (hereinafter also referred to as a "document image")), will be described below as an example of an image scanning device in accordance with the present invention. The present invention is also applicable to image scanning devices of other types, such as MFDs (Multi-Function Devices) having not only the scanner function but also the printer function, copy function, facsimile function, etc.

Figure 2:
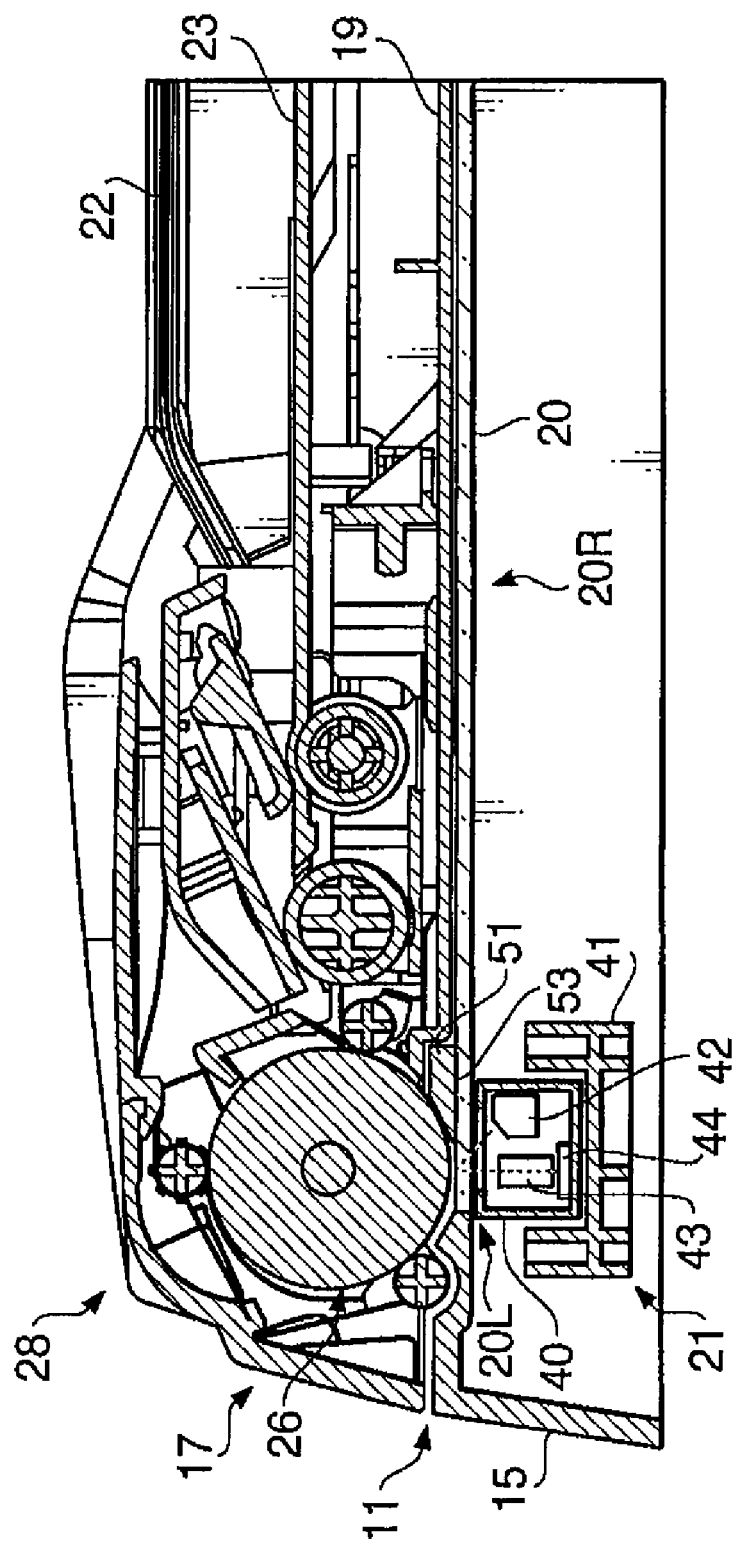
FIG. 2 is a partial vertical sectional view of the scanner (with the document cover closed) viewed in the direction of an arrow II shown in FIG. 1.

FIG. 2 is a partial vertical sectional view of the scanner 10 (with its document cover 17 closed) viewed in the direction of an arrow II shown in FIG. 1. As shown in FIGS. 1 and 2, the scanner 10 includes a document table 11 functioning as a flat bed scanner (FBS). The document table 11 has a platen glass 20 on which the document to be scanned by the FBS is placed. The document table 11 is equipped with the document cover 17 which can be freely opened and closed with respect to the document table 11 to cover the platen glass 20 as needed. The document cover 17 is linked with the document table 11 via hinges (unshown) on the back of the document table 11. The document cover 17 is equipped with an ADF (Automatic Document Feeder) 28 for feeding a document. The scanner 10 is capable of scanning either a document placed on the platen glass 20 or a document being fed by the ADF 28.

The document table 11 has a housing 15 in a shape like a rectangular parallelepiped as shown in FIG. 1. The top of the housing 15 is formed to have an opening, and the platen glass 20 is placed to cover the opening. The platen glass 20 is a transparent plate made up of a single glass plate or acrylic plate, for example. The platen glass 20 is formed to be sufficiently larger than the opening of the housing 15. An area of the platen glass 20 that is exposed through the opening serves as a document scanning area. An image sensor 21 is installed inside the housing 15, by which an image on a document is scanned.

The top of the platen glass 20 is provided with a dividing member 51 as shown in FIGS. 1 and 2. The dividing member 51 divides the scanning area of the platen glass 20 which is exposed as the top of the document table 11. The dividing member 51 is a member like a long flat plate extending in the depth direction of the document table 11 (i.e. the lengthwise direction of the image sensor 21). The scanning area of the platen glass 20 is divided by the dividing member 51 into a first area 20L and a second area 20R. The first area 20L is formed on one side (left-hand side in FIG. 2) of the platen glass 20, as a scanning surface to be used for the document image scanning by use of the ADF 28. The second area 20R is formed on the other side (right-hand side in FIG. 2) of the platen glass 20, as a surface on which a document is placed when the scanner 10 is used as a flat bed scanner (FBS). The dividing member 51 is used as the positioning reference when the document is placed in the second area 20R by the user. The user places the document in the second area 20R with reference to a central position marked on the dividing member 51. The dividing member 51 has various indications representing the central position and positions of both edges of documents in various sizes (A4, B5, 8.5×11", 8.5×14", etc.). The user places each document at a proper position in the second area 20R by reference to the indications.

The document cover 17 is attached to the document table 11 to be opened and closed freely as shown in FIG. 1. When the document cover 17 is closed with respect to the document table 11, the platen glass 20 is covered by the document cover 17. On the other hand, when the document cover 17 is opened with respect to the document table 11, the top of the platen glass 20 is exposed. In this state, the user can place a document on the platen glass 20 (second area 20R) with the scanned surface of the document facing downward. Incidentally, expressions like "the document is placed on the platen glass 20" will be used in the following explanation to mean that the document is placed in the second area 20R of the platen glass 20. The underside of the document cover 17 is provided with a document retainer 19 to cover the second area 20R. The document retainer 19 is formed of a sponge, a white plate, etc. in order to retain a document placed on the platen glass 20. When the document cover 17 is closed, the document placed on the platen glass 20 is pressed against the platen glass 20 by the document retainer 19 being pushed downward by the document cover. In this state, the image sensor 21 is scanned (moved) along the platen glass 20 to carry out the document image scanning.

An open/close switch 24 for detecting the opened/closed state of the document cover 17 is placed in a rear part of the top of the document table 11 as shown in FIG. 1. The open/close switch 24 is biased upward by a spring to protrude from the top of the document table 11. When the document cover 17 is closed, the open/close switch 24 is pressed by the document cover 17 downward into the document table 11 and shifts to an ON state. When the document cover 17 is opened, the open/close switch 24, receiving no downward pressure from the document cover 17, moves upward and shifts from the ON state to an OFF state. Whether the document cover 17 is in an opened position or in a closed position is detected based on the state (OFF or ON) of the open/close switch 24.

As shown in FIG. 2, the document cover 17 is equipped with a feed tray 22 and the aforementioned ADF 28. The feed tray 22 is a tray for receiving and holding documents that are placed by the user. The ADF 28 is a unit for moving the document and a CIS (Contact Image Sensor) 40 relatively with each other. The ADF 28, for feeding the document from the feed tray 22 to an output tray 23 along a feeding path 26, is used with the document cover 17 closed. In the document feeding process executed by the ADF 28, the document placed on the feed tray 22 passes above the first area 20L (see FIG. 4) of the platen glass 20. The CIS 40 (see FIGS. 2 and 6) stays on standby under the first area 20L in order to scan the document fed by the ADF 28. In this state, the document is fed by the ADF 28 from the feed tray 22 to the first area 20L along the feeding path 26. The document scanning operation by the image sensor 21 is carried out in this process.

An operation panel 13 is provided on an upper part of the front of the scanner 10 as shown in FIG. 1. The operation panel 13 includes a liquid crystal display for displaying a variety of information, input keys for letting the user input necessary information, etc. The scanner 10 operates according to the user's input operations through the operation panel 13. An input operation for instructing the scanner 10 to start the scanning of a document placed on the platen glass 20 or the feed tray 22 is also performed by the user through the operation panel 13. Incidentally, the scanner 10 can be operated not only by such instructions inputted through the operation panel 13 but also by instructions that are supplied from a computer (connected to the scanner 10) via a scanner driver, etc.

As shown in FIG. 2, the image sensor 21 installed in the housing 15 includes the CIS 40, a carriage 41 and a scanning mechanism (unshown). The CIS 40 includes a light source 42, a lens 43 and photoreceptor elements 44. The CIS 40 projects light from the light source 42 onto the document in a time-sharing manner and detects reflected light from the document. Specifically, the CIS 40 projects light from the light source 42 onto the document through the platen glass 20, converges the reflected light from the document on the photoreceptor elements 44 by use of the lens 43, and makes the photoreceptor elements 44 convert the received light into an electric signal (image signal). In short, the CIS 40 is an image sensor of the so-called contact type (CIS: Contact Image Sensor). The photoreceptor elements 44 are arranged in a main scanning direction (i.e. the direction orthogonal to the sheet of FIG. 2) in units of chips, for example. The light source 42 and the lens 43 are also placed in the direction of arrangement of the photoreceptor elements 44. The light source 42 in this embodiment includes light emitting elements (LEDs: Light Emitting Diodes) of three different colors: red (R), green (G) and blue (B). The CIS 40 projects light onto the document in the time-sharing manner by successively lighting the light emitting elements of the three colors and detects the reflected light from the document as a color image of the document. The CIS 40 configured as above is mounted on the carriage 41 which moves to and fro along the platen glass 20 in an auxiliary scanning direction (i.e. the horizontal direction in FIG. 2). By the movement of the carriage 41, the CIS 40 can be placed under the first area 20L (for the scanning of a document by use of the ADF 28) or relatively moved with respect to a document placed on the platen glass 20.

Figure 3:
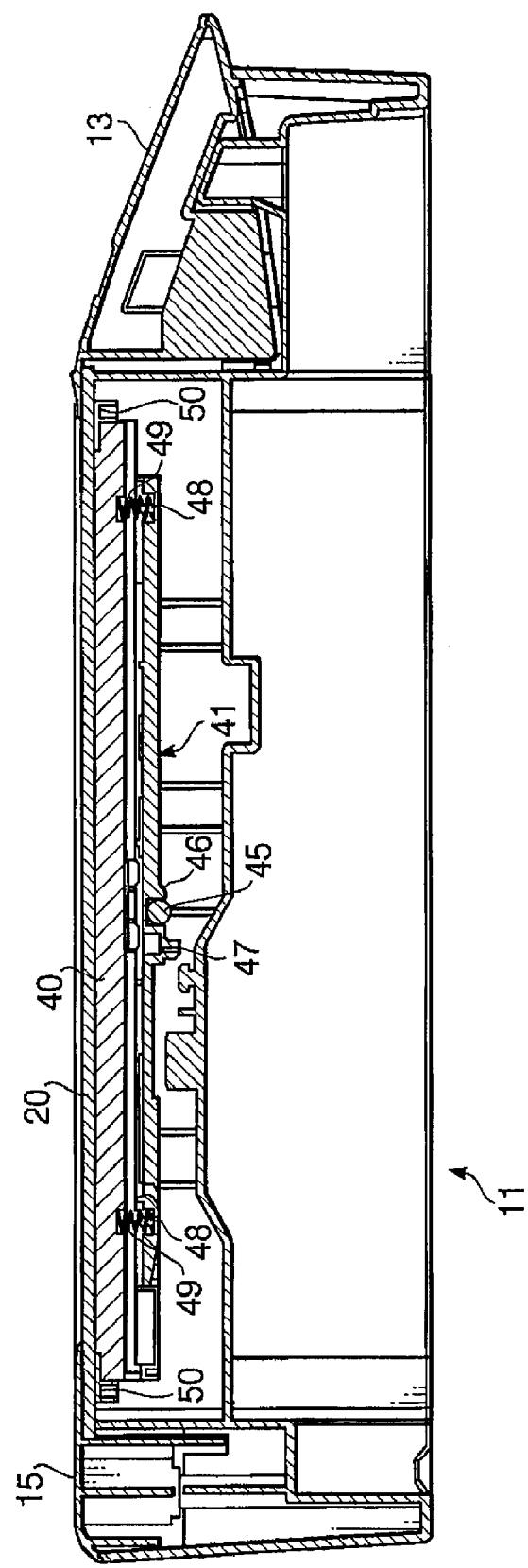
FIG. 3 is a vertical sectional view of a document table of the scanner viewed in the direction of an arrow III shown in FIG. 1.

FIG. 3 is a vertical sectional view of the document table 11 viewed in the direction of an arrow III shown in FIG. 1. In FIG. 3, the document cover 17 is not shown for the sake of simplicity.

As shown in FIG. 3, the carriage 41 is installed in the housing 15 of the document table 11 so that it can be moved to and fro under the platen glass 20 in the width direction of the housing 15 by a belt driving mechanism (unshown) as the unshown scanning mechanism. Inside the housing 15, a guide shaft 45 extends in the width direction of the housing 15. According to the movement of the carriage 41 (on which the CIS 40 is mounted) on and along the guide shaft 45, the CIS 40 moves to and fro along the platen glass 20 in the width direction of the housing 15.

The CIS 40 is supported on the top of the carriage 41 as shown in FIG. 3. Meanwhile, the base of the carriage 41 is provided with a shaft bearing part 46 for bearing the guide shaft 45. Further, a belt attachment part 47 protrudes below from the side of the shaft bearing part 46. The belt attachment part 47 is attached to a timing belt 34 (see FIG. 1) of the belt driving mechanism, by which the carriage 41 is linked with the timing belt 34. The belt driving mechanism includes the timing belt 34, a drive pulley and a driven pulley. The timing belt 34 is stretched across the drive pulley (whose shaft is rotated by a motor) and the driven pulley. By the rotation of the drive pulley, the timing belt 34 is turned.

On the top of the carriage 41, two spring bearing parts 48 are formed at right and left positions (in FIG. 3) that are symmetrical with each other in the main scanning direction as shown in FIG. 3. A compression coil spring 49 is placed between each spring bearing part 48 and the base of the CIS 40. Thus, the CIS 40 is pressed against the under surface of the platen glass 20 by the elastic force of the compression coil springs 49. Meanwhile, the top of the CIS 40 is provided with rollers 50 at both edges in the main scanning direction. The rollers 50 enable the CIS 40 to move in close contact with the under surface of the platen glass 20 according to the movement of the carriage 41. Upon issuance of an instruction for starting the document image scanning, light is projected from the light source 42 onto the document placed on the platen glass 20, the reflected light from the document is received by the photoreceptor elements 44 arranged in the main scanning direction, and an image signal corresponding to one line in the main scanning direction is outputted by the photoreceptor elements 44. Subsequently, the carriage 41 slightly moves in the auxiliary scanning direction to let the CIS 40 carry out the one-line scanning again. By the repetition of the one-line scanning, the whole image on the document is scanned.

Figure 4:
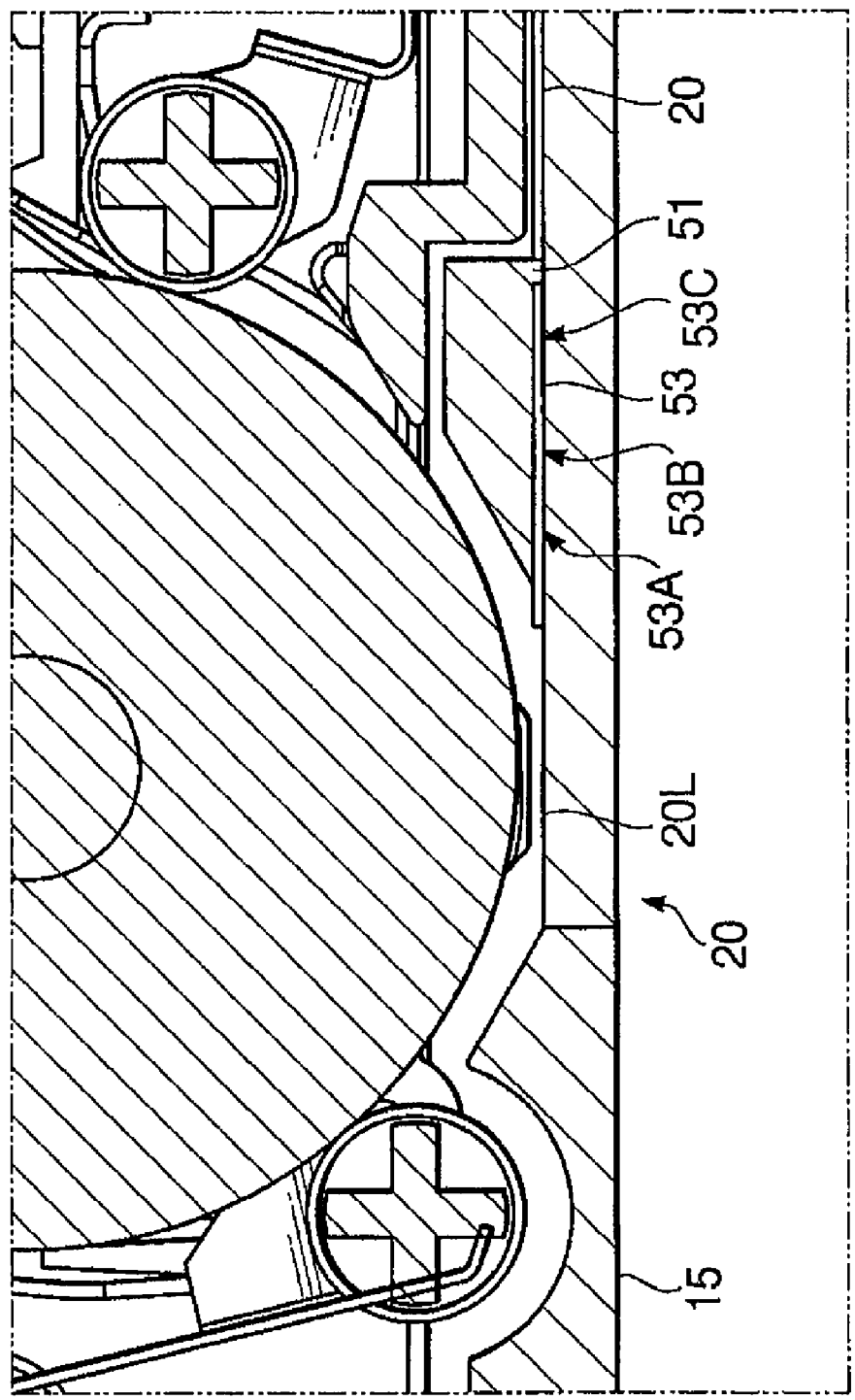
FIG. 4 is an enlarged vertical sectional view showing the structure of the scanner around a reference member.
Figure 5:
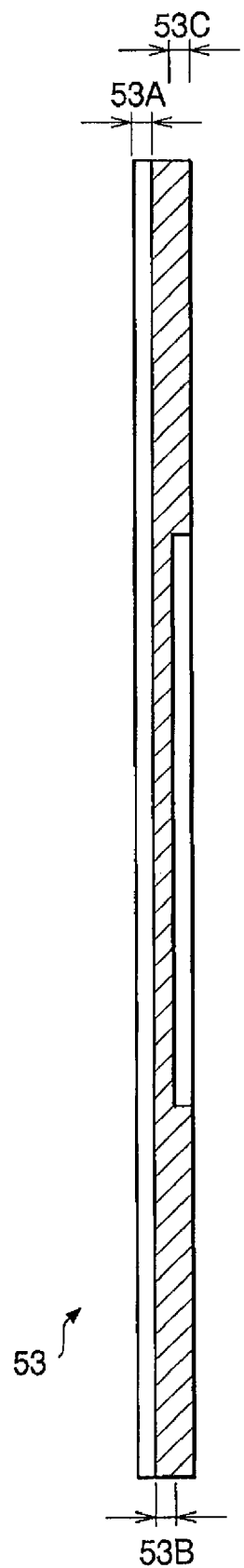
FIG. 5 is a plan view showing the composition of the reference member.

FIG. 4 is an enlarged vertical sectional view showing the structure of the scanner 10 around a reference member 53. FIG. 5 is a plan view showing the composition of the reference member 53.

As shown in FIG. 4, the reference member 53 is provided under the dividing member 51 to be situated between the dividing member 51 and the platen glass 20. The reference member 53, serving as the brightness reference for the CIS 40, is a member like a thin belt covering substantially the whole of the base of the dividing member 51. As shown in FIG. 5, the reference member 53 includes three areas 53A, 53B and 53C arranged in the auxiliary scanning direction of the CIS 40 (i.e. the horizontal direction in FIG. 5). The left-hand side area 53A is a white area, which is used for the adjustment of the light amount of the CIS 40 and the acquisition of white reference data 30 (see FIG. 6) of the CIS 40. The central area 53B is a black area, which is used for the acquisition of black reference data 32 (see FIG. 6) of the CIS 40. The boundary between the left-hand side area 53A and the central area 53B is used as the reference for the auxiliary scanning direction of the CIS 40. The right-hand side area 53C, which is made up of a white area at the center in the depth direction and black areas sandwiching the white area, is used as the reference for the main scanning direction of the CIS 40.

Figure 6:
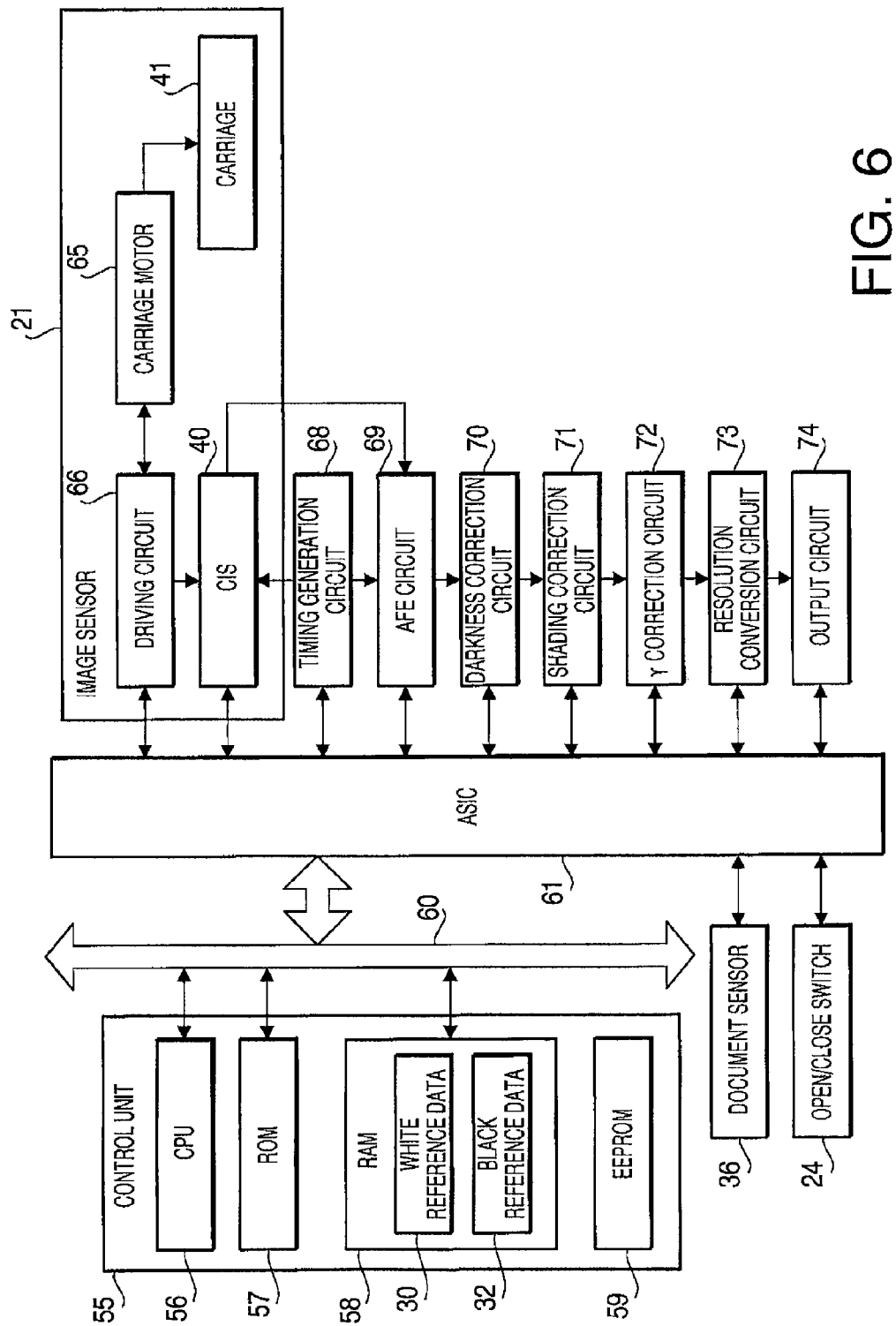
FIG. 6 is a block diagram showing an example of the electrical configuration of a principal part (control unit, etc.) of the scanner.

FIG. 6 is a block diagram showing an example of the electrical configuration of a principal part (control unit 55, etc.) of the scanner 10.

The control unit 55 is a unit for controlling the overall operation of the scanner 10. As shown in FIG. 6, the control unit 55 is configured as a microcomputer including a CPU (Central Processing Unit) 56, a ROM (Read Only Memory) 57, a RAM (Random Access Memory) 58 and an EEPROM (Electrically Erasable and Programmable ROM) 59 as main components. The control unit 55 is connected with an ASIC (Application-Specific Integrated Circuit) 61 via a bus 60.

The ROM 57 stores programs and data for the operation of the scanner 10, such as a control program to be executed by the CPU 56 for controlling various operations of the scanner 10. The RAM 58 serves as a storage area or work area for temporarily storing various data used by the CPU 56 during the execution of the control program, etc. For example, the RAM 58 stores an adjusted value of the light amount of the light source 42 (see FIG. 2) of the CIS 40 (hereinafter referred to as an "adjusted light amount value"), the white reference data 30 and the black reference data 32 acquired in regard to the reference member 53 (see FIG. 5), etc. The adjusted light amount value, the white reference data 30 and the black reference data 32 will be explained in detail later.

The EEPROM 59 stores various settings and flags that should be retained even after the power of the scanner 10 is turned OFF. For example, the EEPROM 59 in this embodiment stores a first signal level, a second signal level and a third signal level. The first and second signal levels are signal intensities to be used by the control unit 55 as criteria for judging the type of the document placed on the platen glass 20, that is, criteria for judging whether the document on the platen glass 20 is a "first-type document" or not. The "first-type document" means a document that does not let through light, such as a book or a booklet. The control unit 55 judges whether the document placed on the platen glass 20 is a first-type document or not by using the first and second signal levels as the criteria. In the following explanation, a document that is not a first-type document will be referred to as a "second-type document". The "second-type document" means a document that lets through light, such as thin paper or a transparent sheet. The third signal level is signal intensity to be used as a criterion for the detection of external light inside the document table 11. The control unit 55 detects external light entering the document table 11 through the platen glass 20 (i.e. judges whether external light has entered the document table 11 or not) by using the third signal level as the criterion. These processes executed by the control unit 55 will be explained in detail later.

As shown in FIG. 6, the image sensor 21, a timing generation circuit 68, an AFE (Analog Front End) circuit 69, a darkness correction circuit 70, a shading correction circuit 71, a γ correction circuit 72, a resolution conversion circuit 73, an output circuit 74, a document sensor 36 and the open/close switch 24 are connected to the ASIC 61.

The image sensor 21 executes the document scanning operation and outputs the scanned image of the document (document image) as an image signal. The image sensor 21 includes the CIS 40, the carriage 41, a carriage motor 65 and a driving circuit 66. The driving circuit 66 supplies a driving signal to the carriage motor 65 according to a phase excitation signal supplied from the ASIC 61, etc. By the rotation of the carriage motor 65 receiving the driving signal, the carriage 41 is moved to and fro. The driving circuit 66 also serves for adjusting operating currents for lighting the light source 42 (see FIG. 2) of the CIS 40 and adjusting lighting time periods of the RGB colors of the light source 42. The control unit 55 makes the CIS 40 carry out the scanning operation including a first operation and a second operation, by controlling the image sensor 21 via the ASIC 61 during the to-and-fro movement of the carriage 41. In addition to the control of the scanning operation, the control unit 55 executes various processes according to the control program stored in the ROM 57, such as the acquisition of the adjusted light amount value, the white reference data 30 and the black reference data 32.

The CIS 40 executes the document image scanning line by line by projecting light from the light source 42 onto a document placed on the platen glass 20 or a document being fed through the first area 20L by the ADF 28. The scanned image is outputted from the CIS 40 to the AFE circuit 69 as the image signal. The CIS 40 executes the first operations repeatedly during the process for moving the carriage 41 along the second area 20R of the platen glass 20. Meanwhile, the CIS 40 executes the second operation in prescribed intervals between the repeatedly executed first operations. The first operation is an operation to project light from the light source 42 onto the document placed on the platen glass 20 and outputting the scanned document image as the one-line image signal. In other words, the first operation means the operation of the CIS 40 for executing the one-line scanning of the document in the main scanning direction in the lighting period of the light source 42 and outputting the image signal of the line. Thus, the image signal obtained by the first operation is an image signal that is acquired in the lighting period of the light source 42. By the repetition of the first operation, image data of the whole document is obtained. Meanwhile, the second operation is an operation to output an image of the document as a one-line image signal in the OFF state of the light source 42. In other words, the second operation means the operation of the CIS 40 for executing the one-line scanning of the document in the main scanning direction in the non-lighting period of the light source 42 and outputting the image signal of the line. Thus, the image signal obtained by the second operation is an image signal that is acquired in the non-lighting period of the light source 42. In the following explanation, each image signal obtained by the first operation will also be called a "lighting period image signal", and each image signal obtained by the second operation will also be called a "non-lighting period image signal".

The lighting period image signal obtained by the CIS 40 by the first operation is processed by circuits 69-73 which will be explained later, outputted from the output circuit 74, and stored in the RAM 58 as image data. The lighting period image signal (image data) stored in the RAM 58 is transferred to a computer, printer, etc. as scan data. Meanwhile, the non-lighting period image signal obtained by the CIS 40 by the second operation is processed by the circuits 69-73, outputted from the output circuit 74, and stored in the RAM 58 as judgment data. Based on the non-lighting period image signal (judgment data) stored in the RAM 58, the control unit 55 makes an external light judgment and a document judgment. The external light judgment is a process for judging whether external light entered the document table 11 or not. The document judgment is a process for judging whether the document placed on the platen glass 20 is a first-type document or not. The CIS 40 moves along the platen glass 20 staying in the close vicinity of the platen glass 20 since the CIS 40 is mounted on the carriage 41 which moves to and fro along the platen glass 20 as mentioned above. Thus, external light is accurately detected by the second operation. Consequently, the external light judgment and the document judgment are carried out with high accuracy.

The timing generation circuit 68 supplies a trigger signal (TG) and a clock signal to the CIS 40, while supplying a control signal to the AFE circuit 69. The trigger signal is a signal which determines the cycle of the one-line scanning operation and the timing for starting the driving of the CIS 40. The clock signal is a signal which determines the timing for the CIS 40 to output an image signal corresponding to one pixel. In sync with the clock signal, the CIS 40 outputs the image signal in units of pixels. The CIS 40 performs the first operation and the second operation according to the trigger signal and the control signal supplied from the timing generation circuit 68, the operating currents supplied from the driving circuit 66, etc.

The AFE circuit 69 samples and holds each of the analog image signals outputted by the CIS 40 and executes digital conversion to the sampled and held image signal. Here, the "analog image signals" mean the lighting period image signal and the non-lighting period image signal outputted by the CIS 40. The digital conversion is a process for converting each analog image signal outputted by the CIS 40 into a digital signal that is made up of a digital code of a prescribed number of bits. The digital conversion is carried out by an analog-to-digital converter. Consequently, each analog image signal inputted to the AFE circuit 69 is outputted to the darkness correction circuit 70 as an 8-bit digital image signal (with 256-step gradation: 0-255), for example.

The darkness correction circuit 70 corrects the digital image signal outputted by the AFE circuit 69 in order to compensate for variations among the photoreceptor elements 44 (see FIG. 2). The image signal correction by the darkness correction circuit 70 is carried out based on the black reference data 32 stored in the RAM 58.

The shading correction circuit 71 executes shading correction to the lighting period image signal and the non-lighting period image signal outputted by the CIS 40 as the result of the first operation and the second operation (specifically, the image signals outputted by the darkness correction circuit 70). By the shading correction, variations among the photoreceptor elements 44 and variations in the light source 42 are compensated for. The shading correction by the shading correction circuit 71 is carried out based on the white reference data 30 stored in the RAM 58.

The γ correction circuit 72 is a circuit for correcting the γ curves. The resolution conversion circuit 73 is a circuit for converting the resolution. The output circuit 74 is a circuit for outputting the image signal which has been corrected by the above circuits 69-73. The image signal outputted by the output circuit 74 is stored in the RAM 58. The darkness correction circuit 70, the shading correction circuit 71, the γ correction circuit 72, the resolution conversion circuit 73 and the output circuit 74 which have been briefly explained above are well-known circuits, and thus detailed explanation thereof is omitted here.

The open/close switch 24 is a switch for detecting whether the document cover 17 (see FIG. 1) is in the opened position or in the closed position as mentioned above. When the open/close switch 24 is in the OFF state, the control unit 55 judges that the document cover 17 is in the opened position. On the other hand, when the open/close switch 24 is in the ON state, the control unit 55 judges that the document cover 17 is in the closed position. The opened position means a state in which the document cover 17 is opened with respect to the document table 11, while the closed position means a state in which the document cover 17 is closed with respect to the document table 11.

The document sensor 36, for detecting whether there exists a document on the feed tray 22 (see FIG. 2) or not, is placed at a prescribed position in the feed tray 22. In this embodiment, the document sensor 36 is implemented by a mechanical sensor, for example. The document sensor 36 includes a transmissive optical sensor (photo interrupter) and a blocking member which is supported by a shaft to be rotatable. The photo interrupter includes a light emitting part (for emitting light) and a photoreceptor part (for receiving the light emitted by the light emitting part) facing each other. The document sensor 36 outputs a sensor signal in response to the photoreception by the photoreceptor part of the photo interrupter. When the blocking member is situated at a position for blocking the optical path between the light emitting part and the photoreceptor part, the light emitted by the light emitting part is blocked by the blocking member and is not received by the photoreceptor part. In this state, the document sensor 36 remains in an OFF state since the blocking member is being detected by the photoreceptor part. When a document is placed on the feed tray 22, the document makes contact with the blocking member to rotate it, by which the blocking member separates from the position for blocking the optical path of the photo interrupter. Consequently, the light emitted by the light emitting part is received by the photoreceptor part, that is, the document sensor 36 shifts to an ON state. Thanks to the change of state of the document sensor 36 caused by a document placed on the feed tray 22, the control unit 55 is capable of judging whether a document exists on the feed tray 22 or not based on the sensor signal outputted by the document sensor 36.

Figure 7:
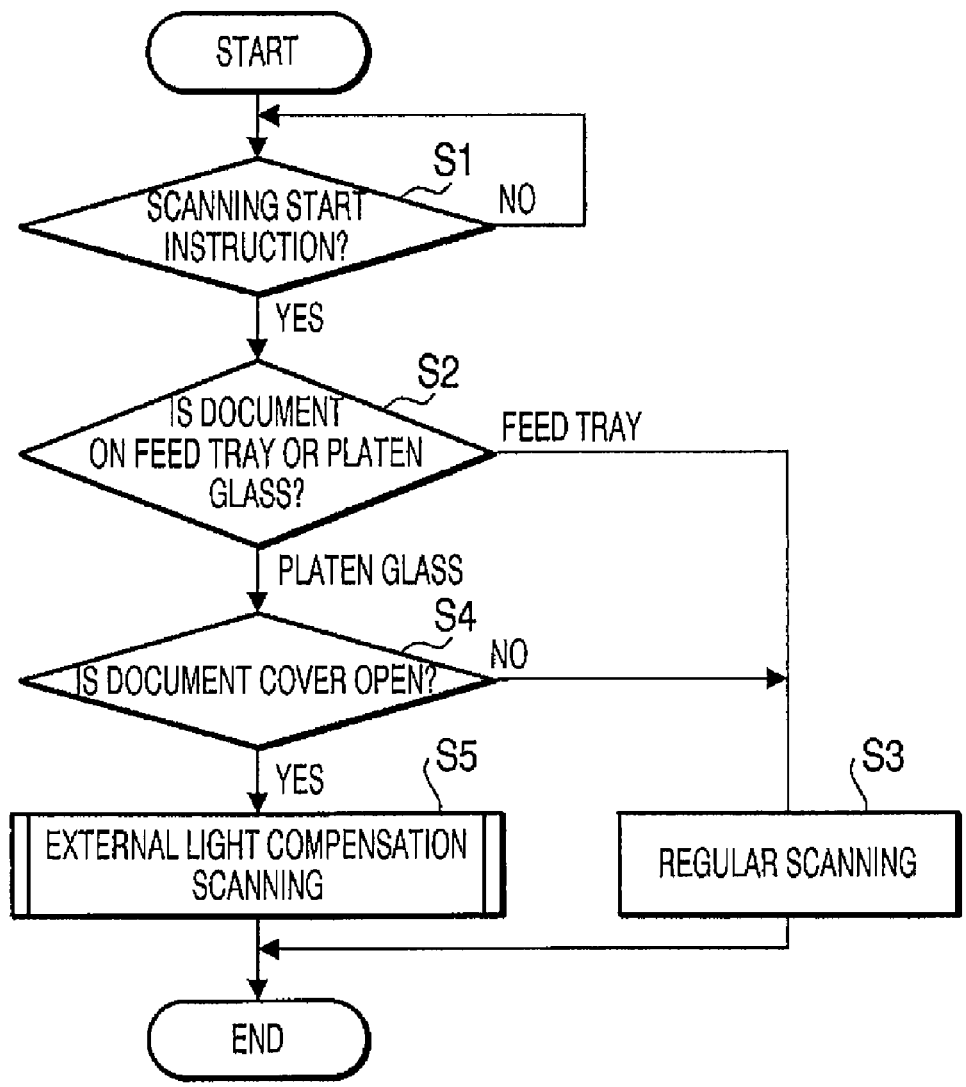
FIG. 7 is a flow chart showing a process executed by the scanner.

FIG. 7 is a flow chart showing a process executed by the scanner 10. The process of FIG. 7 is executed by the scanner 10 according to instructions that are issued by the control unit 55 based on the control program stored in the ROM 57.

The control unit 55 judges whether a scanning starting instruction (requesting the scanner 10 to start the scanning of a document) has been inputted or not based on whether a prescribed input operation has been performed by the user through the operation panel 13 or not (S1). When no scanning starting instruction has been inputted (S1: NO), the process returns to the step S1. When the scanning starting instruction has been inputted (S1: YES), the control unit 55 judges whether a document has been placed on the feed tray 22 or on the platen glass 20 (S2). The judgment of S2 is made based on the detection by the document sensor 36 in the feed tray 22. Specifically, when the document sensor 36 is in the ON state, the control unit 55 judges that a document has been placed on the feed tray 22. On the other hand, when the document sensor 36 is in the OFF state, the control unit 55 judges that a document has been placed in the second area 20R of the platen glass 20. When a document has been placed on the feed tray 22 (S2: FEED TRAY), the control unit 55 executes "regular scanning" for the document (S3). In the regular scanning executed in this case, light beams of the three colors (R, G, B) are successively projected from the light source 42 onto the document (being fed by the ADF 28) in the time-sharing manner and the document images successively scanned by the CIS 40 are outputted as the one-line image signals. Concretely, the CIS 40 is placed under the first area 20L (see FIG. 2) by the movement of the carriage 41. In this state, the document on the feed tray 22 is fed along the feeding path 26 to pass above the first area 20L (see FIG. 4) and the image on the document passing above the first area 20L is scanned by the CIS 40 line by line.

On the other hand, when a document has been placed on the platen glass 20 in S2 (S2: PLATEN GLASS), the control unit 55 judges whether the document cover 17 is in the opened position or in the closed position based on the detection by the open/close switch 24 (S4). Specifically, the control unit 55 judges that the document cover 17 is in the opened position if the open/close switch 24 is in the OFF state, otherwise the control unit 55 judges that the document cover 17 is in the closed position. When the document cover 17 is in the closed position (S4: NO), the control unit 55 executes the regular scanning for the document on the platen glass 20 (S3). The regular scanning executed in this case is a scanning operation repeating the first operation, differently from the aforementioned regular scanning. Here, the first operation is the aforementioned operation projecting light from the light source 42 onto the document on the platen glass 20 and outputting the scanned document image as the one-line image signal. The whole image on the document placed on the platen glass 20 is scanned by the repetition of the first operation during the movement of the carriage 41. In this regular scanning, the second operation is not executed. In other words, the regular scanning in this case is document scanning that is executed by the CIS 40 exclusively in the lighting periods of the light source 42.

On the other hand, when the document cover 17 is in the opened position (S4: YES), the control unit 55 executes "external light compensation scanning" (S5). The external light compensation scanning is a scanning operation repeatedly executing the first operation while executing the second operation in the non-lighting periods (i.e. the prescribed intervals between the first operations). In other words, the external light compensation scanning is document scanning that is executed by the CIS 40 both in the lighting periods and the non-lighting periods of the light source 42. As will be explained later, in the external light compensation scanning, whether external light is detected inside the document table 11 or not is judged based on the non-lighting period image signal obtained by the second operation. When external light is detected inside the document table 11, a correction process for removing the effect of the external light from the lighting period image signal obtained by the first operation is carried out.

The scanner 10 is set in a first mode or a second mode at the start of the document scanning. The first mode is a mode in which the CIS 40 scans the document exclusively in the lighting periods of the light source 42. The second mode is a mode in which the CIS 40 scans the document both in the lighting periods and the non-lighting periods of the light source 42. The scanner 10 executes the step S3 (regular scanning) when it has been set in the first mode, while executing the step S5 (external light compensation scanning) when it has been set in the second mode. The mode of the scanner 10 is switched between the first mode and the second mode based on the result of the steps S2 and S4 as above.

As above, the control unit 55 checks the status of the document sensor 36 (i.e. whether a document exists on the feed tray 22 or not) in response to the scanning starting instruction. When a document is detected by the document sensor 36, the control unit 55 judges that the scanning of a document placed on the feed tray 22 has been ordered by the user. In this case, no external light enters the document table 11 since the document cover 17 is in the closed position. On the other hand, when no document is detected by the document sensor 36, the control unit 55 judges that the scanning of a document placed on the platen glass 20 has been ordered by the user. In this case, external light can enter the document table 11 when the document cover 17 is in the opened position. External light detection which will be explained later is started on condition that no document is detected by the document sensor 36 and the opened position of the document cover 17 is detected by the open/close switch 24. The external light detection is a process for detecting external light entering the document table 11. Incidentally, whether the document cover 17 is in the opened position or in the closed position is detected by the open/close switch 24 at the start of the document scanning.

Figure 8:
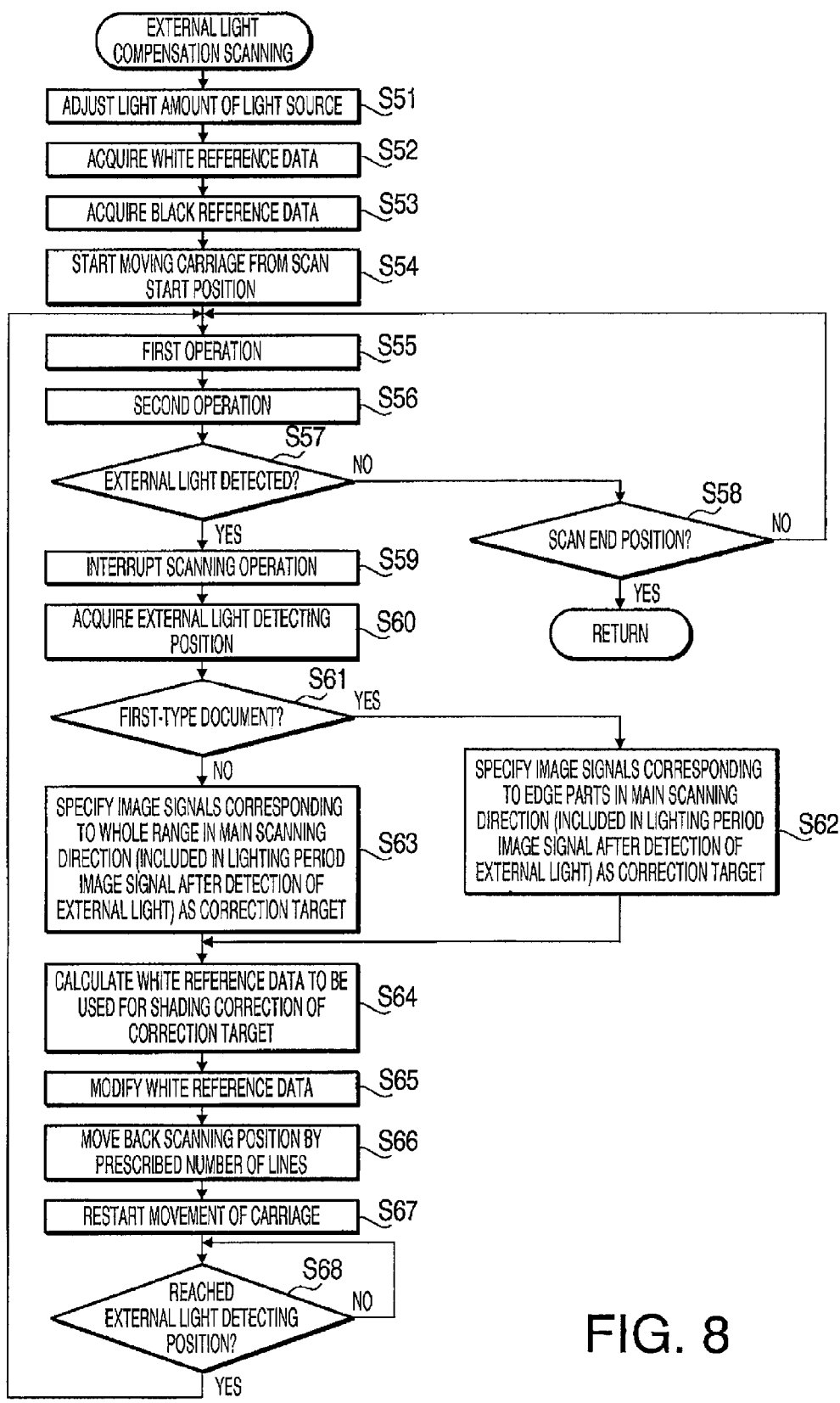
FIG. 8 is a flow chart showing the details of step S5 (external light compensation scanning) in FIG. 7.

FIG. 8 is a flow chart showing the details of the step S5 (external light compensation scanning) in FIG. 7. The external light compensation scanning shown in FIG. 8 is executed when the scanning starting instruction is issued in a state in which a document has been placed on the platen glass 20 and the document cover 17 is in the opened position.

In the case where the document cover 17 is judged to be in the opened position (S4: YES), the control unit 55 judges the size of the document. Specifically, the judgment of the document size is made based on information supplied from a computer (via a scanner driver, etc.) or information inputted through the operation panel 13. The document size judgment may also be made by other methods. For example, the document size may be judged by executing a prescan. It is also possible to install sensors (for detecting a document in the second area 20R) inside the document table 11 and judge the document size based on the detection by the sensors.

Subsequently, the control unit 55 adjusts the light amount of the light source 42 (S51). Specifically, the control unit 55 drives the carriage motor 65 (see FIG. 6) to move the carriage 41 to a position where the CIS 40 faces the left-hand side area 53A of the reference member 53 (see FIGS. 4 and 5), and makes the light source 42 project light onto the area 53A initially at a small light amount. In this case, the output of the photoreceptor elements 44 of the CIS 40 (see FIG. 2) is low since the reflected light from the area 53A is weak. Then, the control unit 55 gradually increases the light amount of the light source 42 until the output of the photoreceptor elements 44 reaches a prescribed level, determines the aforementioned "adjusted light amount value" as the light amount of the light source 42 at this point (when the output of the photoreceptor elements 44 equals the prescribed level), and stores the adjusted light amount value in the RAM 58. In other words, the adjusted light amount value means the light amount of the light source 42 when the amount of light received by the photoreceptor elements 44 is a prescribed amount.

In the next step S52, the control unit 55 acquires the white reference data 30 to be used for the shading correction. Specifically, with the carriage 41 placed at the position corresponding to the left-hand side area 53A (see FIGS. 4 and 5), the control unit 55 makes the light source 42 project light upon the area 53A at the light amount specified by the adjusted light amount value, and acquires the white reference data 30 by making the photoreceptor elements 44 convert the reflected light from the area 53A into an electric signal. In other words, the white reference data 30 means the one-line image signal (outputted by the photoreceptor elements 44 arranged in the main scanning direction) that is acquired when light is projected onto the area 53A by the light source 42 at the adjusted light amount value. The acquired white reference data 30 is stored in the RAM 58. The white reference data 30 may also be acquired by executing the image scanning of the area 53A more than once and taking the average of the obtained data. The operation for acquiring the white reference data 30 may also be carried out by moving the carriage 41 within the left-hand side area 53A.

In the next step S53, the control unit 55 acquires the black reference data 32. Specifically, the control unit 55 drives the carriage motor 65 to move the carriage 41 to a position where the CIS 40 faces the central area 53B of the reference member 53, and generates the black reference data 32 from the output of the photoreceptor elements 44 receiving light in the OFF state of the light source 42. In other words, the black reference data 32 means the one-line image signal (outputted by the photoreceptor elements 44 arranged in the main scanning direction) that is acquired by scanning the central area 53B in the OFF state of the light source 42. The acquired black reference data 32 is stored in the RAM 58. The black reference data 32 may also be acquired by executing the image scanning of the area 53B more than once and taking the average of the obtained data. The operation for acquiring the black reference data 32 may also be carried out by moving the carriage 41 within the central area 53B. Incidentally, the steps S52 and S53 may also be executed in reverse order, that is, the white reference data 30 may be acquired after the acquisition of the black reference data 32.

After executing the steps S51-S53, the control unit 55 drives the carriage motor 65 to move the carriage 41 to a scan start position. The scan start position is a position at which the carriage 41 is placed at the start of the scanning of a document placed in the second area 20R of the platen glass 20. The control unit 55 starts moving the carriage 41 from the scan start position by rotating the carriage motor 65 in a normal direction (S54). During the movement of the carriage 41, the first operation and the second operation which will be explained below are executed alternately by the CIS 40.

The control unit 55 makes the CIS 40 execute the first operation during the movement of the carriage 41 (S55). In the first operation, the image on the document placed on the platen glass 20 is scanned for one line in the main scanning direction in the ON state of the light source 42. The first operation in this embodiment is an operation successively projecting light beams of the three colors (R, G, B) from the light source 42 onto the document and outputting the document image as one-line image signals regarding the three colors. By the first operation, an analog image signal corresponding to one line is outputted from the CIS 40 to the AFE circuit 69 in regard to each color component (R component, G component, B component). Incidentally, the first operation in the present invention is not restricted to the color image scanning operation (successively projecting light beams of the three colors from the light source 42 onto the document and outputting the document image as the one-line image signals regarding the three colors), that is, the first operation may also be executed as a monochrome image scanning operation (projecting a light beam of a single color from the light source 42 onto the document and outputting the document image as a one-line image signal regarding the single color).

Subsequently to the first operation, the control unit 55 makes the CIS 40 execute the second operation (S56). In the second operation, the image on the document placed on the platen glass 20 is scanned for one line in the main scanning direction in the OFF state of the light source 42. By the second operation, an analog image signal corresponding to one line is outputted from the CIS 40 to the AFE circuit 69. While the step S56 is executed after the step S55 in this embodiment, the steps S55 and S56 may also be executed in reverse order, that is, the first operation may be executed after the second operation. In the following, the scanning operation by the CIS 40, including the first operation and the second operation, will be described in detail referring to FIG. 9.

Figure 9:
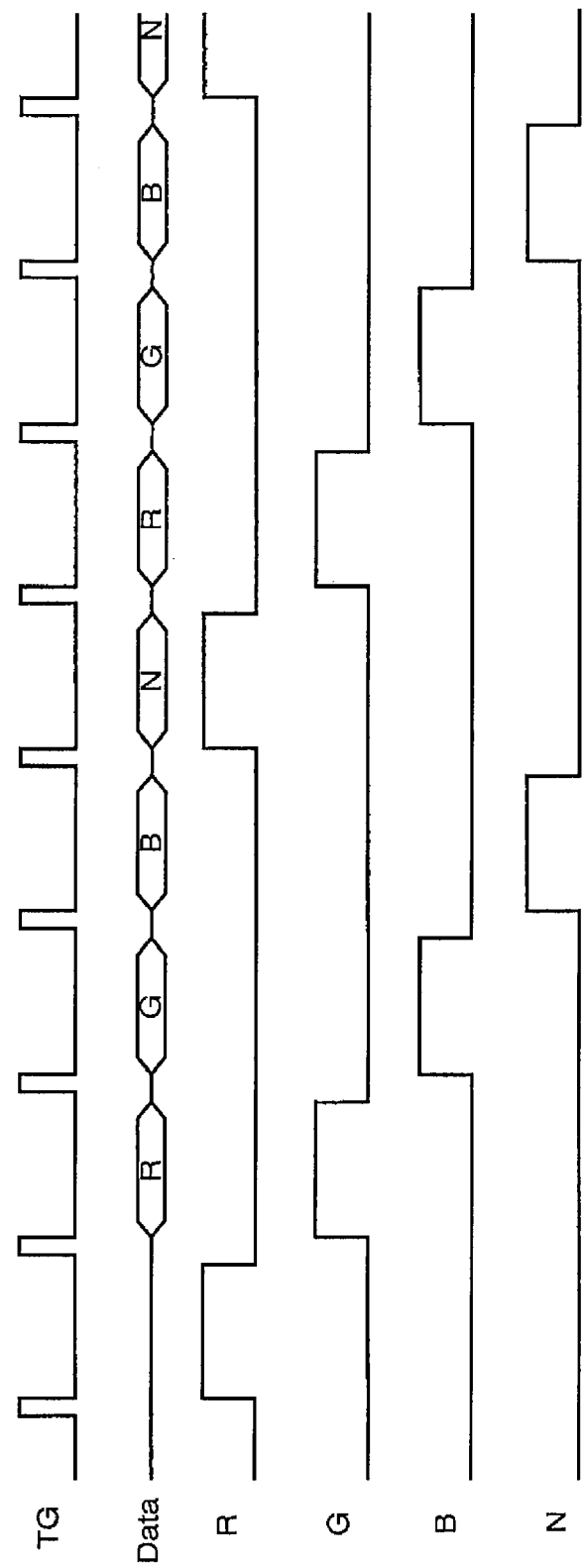
FIG. 9 is a timing chart showing a document scanning operation performed by a CIS (Contact Image Sensor) of the scanner.

FIG. 9 is a timing chart showing the document scanning operation performed by the CIS 40. Shown in FIG. 9 are the trigger signal (TG) supplied from the timing generation circuit 68 to the CIS 40 (see FIG. 6), the image data (Data) outputted by the CIS 40, and scan timing regarding image data of each color component. The trigger signal (TG) is a control signal instructing the CIS 40 to start the one-line scanning. The line "R" in FIG. 9 represents the timing of one-line image scanning with an R (red) element of the light source 42 lighted. The line "G" represents the timing of one-line image scanning with a G (green) element of the light source 42 lighted. The line "B" represents the timing of one-line image scanning with a B (blue) element of the light source 42 lighted. The line "N" represents the timing of one-line image scanning with the light source 42 in the OFF state. "Data" represents the one-line image signals outputted by the CIS 40 at these timings.

In response to the trigger signal (TG) supplied from the timing generation circuit 68, image scanning is carried out by the CIS 40 with the R element of the light source 42 lighted by the driving circuit 66 as shown in FIG. 9, by which an analog image signal of the R component corresponding to one line is outputted from the CIS 40 to the AFE circuit 69 as image data. The one-line analog image signal of the R component is outputted by the CIS 40 in units of pixels in sync with a clock signal (unshown) supplied from the timing generation circuit 68. In response to the next rising edge of the trigger signal (TG) supplied from the timing generation circuit 68, image scanning is carried out by the CIS 40 with the G element of the light source 42 lighted, by which an analog image signal of the G component corresponding to one line is outputted from the CIS 40 to the AFE circuit 69 as image data. Subsequently, in response to the next rising edge of the trigger signal (TG), image scanning is carried out by the CIS 40 with the B element of the light source 42 lighted, by which an analog image signal of the B component corresponding to one line is outputted from the CIS 40 to the AFE circuit 69 as image data. As above, in the first operation, light beams of the three colors are successively projected from the light source 42 onto the document and the scanned document image is outputted from the CIS 40 as the one-line image signals regarding the three colors. These image signals are the aforementioned lighting period image signal.

At the next rising edge of the trigger signal (TG) after the completion of the first operation, the light source 42 is not lighted by the driving circuit 66. In this state, image scanning as the second operation is carried out by the CIS 40. By the second operation, the one-line image signal as the judgment data is outputted from the CIS 40 to the AFE circuit 69. This image signal is the aforementioned non-lighting period image signal.

Although not shown in the figures, the one-line image signal outputted by the photoreceptor elements 44 in the CIS 40 is temporarily stored in an analog shift register via a transfer gate in response to the trigger signal (TG) supplied to the CIS 40. In response to the next (rising edge of the) trigger signal (TG), electric charge of the photoreceptor elements 44 (image signal) is reset, and the one-line image signal which has been stored in the analog shift register is outputted from the CIS 40 pixel by pixel on each input of the clock signal from the timing generation circuit 68. Consequently, each image signal regarding each color (image data: Data) is outputted from the CIS 40 slightly after the turning ON or OFF of the corresponding (R, G or B) element of the light source 42 as shown in FIG. 9. Incidentally, the operating time of the second operation, which is set substantially equal to that of the first operation in this embodiment, may also be set shorter compared to the first operation.

Each of the lighting period image signal (analog) and the non-lighting period image signal (analog) is sampled and held by the AFE circuit 69 and thereby converted into a digital signal. The digital image signal outputted by the AFE circuit 69 undergoes the correction executed by the darkness correction circuit 70 based on the black reference data 32 stored in the RAM 58 and the shading correction executed by the shading correction circuit 71 based on the white reference data 30 stored in the RAM 58. The image signal after the shading correction is processed by the γ correction circuit 72 and the resolution conversion circuit 73 and is outputted from the output circuit 74 to be stored in the RAM 58. The lighting period image signal outputted from the output circuit 74 is stored in the RAM 58 as image data of the document, while the non-lighting period image signal outputted from the output circuit 74 is stored in the RAM 58 as the judgment data.

Referring again to FIG. 8, after the completion of the second operation (S56), the control unit 55 judges whether external light was detected inside the document table 11 or not based on the non-lighting period image signal outputted by the CIS 40 as the result of the second operation (S57). In this step, the control unit 55 judges that external light was detected inside the document table 11 if the intensity of the non-lighting period image signal (which has been stored in the RAM 58 as the judgment data) exceeds the third signal level stored in the EEPROM 59 (see FIG. 6), while judging that no external light was detected if the intensity of the non-lighting period image signal does not exceed the third signal level. Incidentally, this step S57 is executed only when the judgment of S2 is "PLATEN GLASS" and the judgment of S4 is "YES" as shown in FIGS. 7 and 8. In other words, the control unit 55 starts the external light detection of S57 on condition that no document is detected by the document sensor 36 in the feed tray 22 and the opened position of the document cover 17 is detected by the open/close switch 24 (see FIG. 1).

Since the light source 42 is not lighted in the second operation, the intensity of the non-lighting period image signal is equivalent to the black reference data 32 stored in the RAM 58 as long as no external light enters the document table 11. When external light enters the document table 11, the non-lighting period image signal has intensity corresponding to that of the external light entering the document table 11. The third signal level to be stored in the EEPROM 59 is set based on the white reference data 30 after the acquisition of the white reference data 30. In this embodiment, the third signal level, represented by 8-bit data (with 256-step gradation: 0-255), is set at a gradation value corresponding to 25% of that of the white reference data 30. For example, the third signal level is set at a gradation value "60" when that of the white reference data 30 is "240". The non-lighting period image signal is also 8-bit data as mentioned above. For the non-lighting period image signal corresponding to one line in the main scanning direction, whether the gradation value of the image signal exceeds "60" or not is judged in regard to each pixel. It is understood that the judgment as to whether external light is detected is executed based on the distribution of the non-lighting period image signal.

Figure 10:
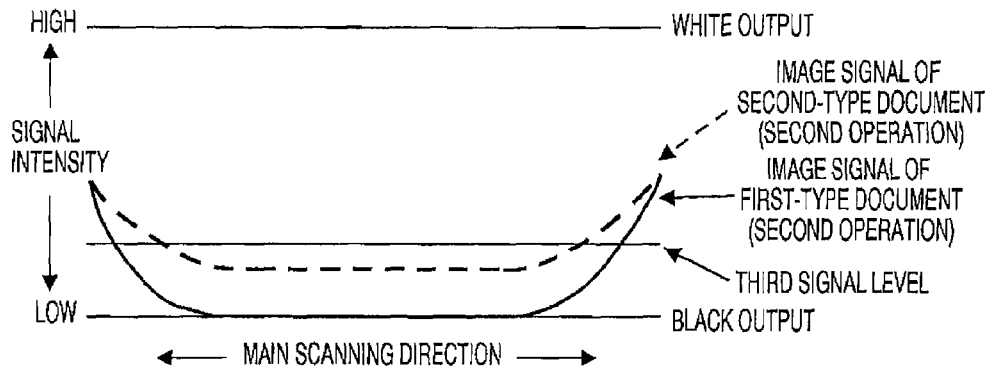
FIG. 10 is a graph for explaining an external light judgment which is made by the control unit.

FIG. 10 is a graph for explaining the external light judgment. In FIG. 10, the solid curve represents a one-line image signal (non-lighting period image signal) obtained by executing the second operation for a first-type document, and the broken curve shows a one-line image signal (non-lighting period image signal) obtained by executing the second operation for a second-type document. The "WHITE OUTPUT" represents a signal obtained by executing the shading correction to a one-line image signal acquired by projecting light from the light source 42 onto the left-hand side area 53A at the adjusted light amount value. The "BLACK OUTPUT" represents a signal obtained by executing the shading correction to a one-line image signal acquired in the OFF state of the light source 42 with the CIS 40 placed at the position corresponding to the central area 53B.

In the case where the first-type document is placed on the platen glass 20, external light enters the document table 11 through areas of the platen glass 20 at both edges of the first-type document in the main scanning direction. Therefore, if the second operation for the first-type document is carried out with the document cover 17 not perfectly closed, the non-lighting period image signal obtained by the second operation has a signal waveform like the solid curve shown in FIG. 10. Specifically, the gradation value of the image signal of the first-type document obtained by the second operation is substantially equal to the black output in the central part in the main scanning direction, while exceeding the third signal level in both edge parts in the main scanning direction. The positions of both edges of the document in the main scanning direction are judged based on the document size which has been determined prior to the step S51. Meanwhile, the number of pixels in the image signal is previously set in this embodiment in regard to each of the central part and both edge parts of the document in the main scanning direction. Thus, the non-lighting period image signal for one line in the main scanning direction is divided into an image signal corresponding to the central part of the document in the main scanning direction and image signals corresponding to the edge parts of the document in the main scanning direction based on the number of signals (pixels) counted from an end (start point) of the non-lighting period image signal. Incidentally, the numbers of pixels to be used for the division into the image signal corresponding to the central part and the image signals corresponding to the edge parts may be changed depending on the document size, for example.

On the other hand, in the case where the second-type document is placed on the platen glass 20, external light enters the document table 11 uniformly through all parts of the second-type document. Therefore, if the second operation for the second-type document is carried out with the document cover 17 not perfectly closed, the non-lighting period image signal obtained by the second operation has a signal waveform like the broken curve shown in FIG. 10. Specifically, the gradation value of the image signal of the second-type document obtained by the second operation is greater than the black output in the central part in the main scanning direction due to the external light entering the document table 11 uniformly through the second-type document, while exceeding the third signal level in the edge parts in the main scanning direction due to the external light entering the document table 11 uniformly through the second-type document and through the areas at both edges of the second-type document in the main scanning direction.

The control unit 55 makes the judgment of S57 in FIG. 8 by judging whether the gradation value corresponding to the intensity of the non-lighting period image signal obtained by the second operation exceeds the third signal level or not in regard to each pixel. For example, the control unit 55 judges that external light entered the document table 11 if the non-lighting period image signal (for one line in the main scanning direction) exceeds the third signal level at 50 pixels or more. On the other hand, if the number of pixels in the image signal exceeding the third signal level is less than 50, the control unit 55 judges that no external light entered the document table 11. As above, in the step S57, external light is judged to have entered the document table 11 on condition that the intensity of the non-lighting period image signal outputted by the CIS 40 as the result of the second operation exceeds the third signal level. Incidentally, while the number of pixels (exceeding the third signal level) to be used as the criterion for the judgment of S57 is set at 50 in this example to reduce error in the judgment, the number of pixels (criterion) can be changed properly depending on the structure of the document table 11 and the document cover 17, etc.

Referring again to FIG. 8, when no external light is detected inside the document table 11 (S57: NO), the control unit 55 judges whether the scanning position with respect to the document on the platen glass 20 has reached a scan end position or not (S58). For example, the control unit 55 counts the number of driving pulses supplied to the carriage motor 65 since the start of the movement of the carriage 41 and judges whether the counted number of pulses has reached a prescribed number of pulses (necessary for moving the carriage 41 to the scan end position) or not. The control unit 55 in S58 judges whether the carriage 41 has reached the scan end position or not as above. When the carriage 41 has not reached the scan end position (S55: NO), the process returns to the step S55 since the document scanning has not been completed. Thus, in the state in which no external light is entering the document table 11, the first operation (S55) and the second operation (S56) are repeated alternately until the document scanning is completed, that is, the second operation is executed in every interval between the repeatedly executed first operations in this embodiment. When the document scanning position is judged to have reached the scan end position (S58: YES), the control unit 55, recognizing that the document scanning has ended, ends the process of FIG. 8 (external light compensation scanning).

On the other hand, when external light is detected inside the document table 11 in S57 (S57: YES), the control unit 55 interrupts the document scanning operation of the CIS 40 (S59). Specifically, the control unit 55 stops the movement of the carriage 41 and interrupts the first and second operations executed by the CIS 40. Subsequently, the control unit 55 acquires an "external light detecting position" which represents a scanning position (scan line) where the external light was detected (S60). Specifically, the control unit 55 acquires information on the external light detecting position based on positional information which has been attached to the non-lighting period image signal (corresponding to a non-lighting period) in which the external light was detected. The information on the external light detecting position may also be acquired from the number of driving pulses supplied to the carriage motor 65 since the start of the movement of the carriage 41. The information on the external light detecting position acquired as above is stored in the RAM 58.

Subsequently, the control unit 55 judges whether the document on the platen glass 20 is a first-type document or not based on the non-lighting period image signal outputted by the CIS 40 as the result of the second operation (S61). The type of the document is judged by the control unit 55 by executing this step S61. Incidentally, the step S61 is executed only when the judgment of S57 is "YES" as shown in FIG. 8. In other words, the judgment on whether the document on the platen glass 20 is a first-type document or not ("document judgment" which will be explained below) is carried out on condition that external light entering the document table 11 is detected by the control unit 55.

Figure 11:
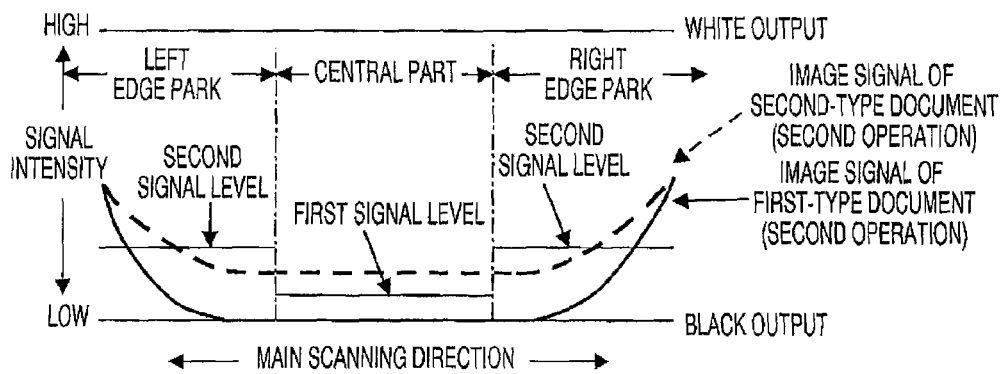
FIG. 11 is a graph for explaining a document judgment which is made by the control unit.

FIG. 11 is a graph for explaining the document judgment. In FIG. 11, the image signal of the first-type document (solid curve), the image signal of the second-type document (broken curve), the white output and the black output are those already explained referring to FIG. 10. The first signal level and the second signal level in FIG. 11 are threshold values stored in the EEPROM 59 to be used as criteria for judging whether the document placed in the second area 20R of the platen glass 20 is a first-type document or not. The intensity of the non-lighting period image signal of the first-type document obtained by the second operation is substantially equal to the black output in the central part in the main scanning direction, while increasing in the edge parts in the main scanning direction to exceed the second signal level. Meanwhile, the non-lighting period image signal of the second-type document obtained by the second operation has higher intensity (gradation value) compared to the image signal of the first-type document substantially throughout the whole range in the main scanning direction due to the effect of the external light uniformly passing through the second-type document (i.e. the external light entering the document table 11 uniformly through the second-type document). Comparing the image signals of the first and second-type documents obtained by the second operation, gradation values of both image signals exceed the second signal level in the edge parts in the main scanning direction as shown in FIG. 11 since external light enters the document table 11 through the areas at both edges of the document in the main scanning direction irrespective of whether the document is a first-type document or a second-type document. Meanwhile, in the central part in the main scanning direction, the intensity of the image signal of the first-type document is substantially equal to the black output (since no external light passes through the first-type document), while that of the image signal of the second-type document exceeds the first signal level due to the effect of the external light passing through the second-type document. As above, by properly setting the first and second signal levels, the judgment on whether the document on the platen glass 20 is a first-type document or not can be made precisely and with ease.

In the step S61, the control unit 55 judges that the document in the second area 20R is a first-type document when the following two conditions are satisfied, for example:

1. The intensity of the non-lighting period image signal corresponding to the central part of the document in the main scanning direction is less than the first signal level.

2. The intensity of the non-lighting period image signals corresponding to the edge parts in the main scanning direction exceeds the second signal level.

Thus, when the non-lighting period image signal indicated by the solid curve in FIG. 11 is obtained by the second operation, the document on the platen glass 20 is judged to be a first-type document. On the other hand, when the non-lighting period image signal indicated by the broken curve in FIG. 11 is obtained by the second operation, the document on the platen glass 20 is judged not to be a first-type document, that is, judged to be a second-type document.

As is clear from the above explanation, in cases where the document on the platen glass 20 is a first-type document, only image signals corresponding to the edge parts of the document in the main scanning direction (included in the lighting period image signal corresponding to one line in the main scanning direction) are affected by external light. When the document on the platen glass 20 is judged to be a first-type document (S61: YES), the control unit 55 specifies the image signals corresponding to the edge parts of the document in the main scanning direction, which are included in the lighting period image signal obtained by the first operation after the judgment that external light entered the document table 11, as the target of correction (S62). On the other hand, in cases where the document is not a first-type document (i.e. second-type document), external light uniformly passes through the document. When the document on the platen glass 20 is judged not to be a first-type document (S61: NO), the control unit 55 specifies the whole of the lighting period image signal (corresponding to the whole range in the main scanning direction) obtained by the first operation after the detection of the external light entering the document table 11 as the correction target (S63).

Subsequently, the control unit 55 calculates the white reference data to be used for the shading correction of the correction target (S64). In cases where the step S62 has been executed, white reference data to be used for the shading correction of the lighting period image signals corresponding to the edge parts of the document in the main scanning direction is calculated (without calculating white reference data to be used for the shading correction of the lighting period image signal corresponding to the central part of the document in the main scanning direction). Meanwhile, in cases where the step S63 has been executed, white reference data to be used for the shading correction of the whole lighting period image signal (corresponding to the whole range of the document in the main scanning direction) is calculated, that is, white reference data for one line in the main scanning direction is calculated. The calculation of the white reference data is executed based on the non-lighting period image signal (in which external light is judged to have entered the document table 11 in S57) and the following expression:

$$W = W_0 \times \alpha \times V_N / B$$

where "W" denotes the white reference data to be obtained, "$W_0$" denotes the white reference data 30 stored in the RAM 58, "$\alpha$" denotes a correction factor (which can be set at 0.5, 1, 1.5, etc.), "B" denotes the black reference data 32 stored in the RAM 58, and "$V_N$" denotes the intensity of the non-lighting period image signal obtained by the second operation in which external light is judged to be actually entering the document table 11 (8-bit data in this example). The non-lighting period image signal (obtained by the second operation) and the white reference data 30 are image signals corresponding to one line in the main scanning direction. The process for calculating the white reference data based on the above expression is carried out for each of the pixels arranged in the main scanning direction.

Subsequently, the control unit 55 modifies (updates) the white reference data 30 stored in the RAM 58 (S65). Specifically, the control unit 55 overwrites part or all of the white reference data 30 stored in the RAM 58 with the white reference data obtained by the above step S64. As above, the control unit 55 executes the correction process on condition that external light entering the document table 11 is detected in the step S57. The "correction process" means the process for removing the effect of the external light from the image signal outputted by the CIS 40 scanning the document in the lighting period of the light source 42 as mentioned above, which corresponds to the process for modifying the white reference data 30 in this embodiment.

Figure 12A:
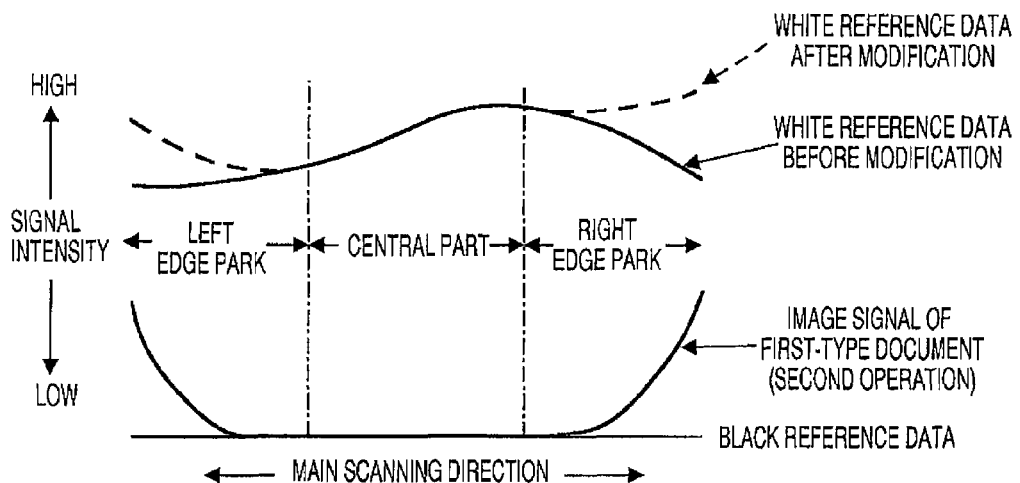
Figure 12B:
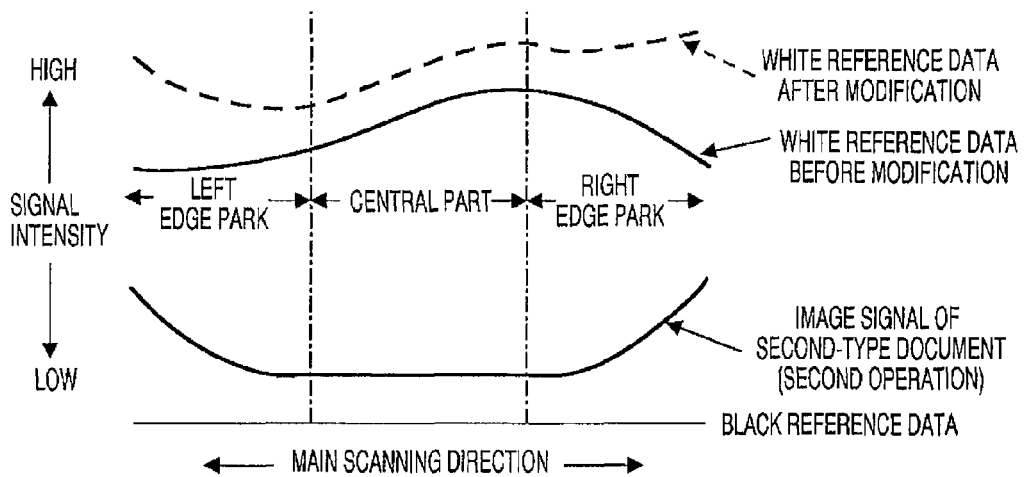

FIGS. 12A and 12B are graphs for explaining the process for modifying the white reference data 30, wherein FIG. 12A shows a case where the document on the platen glass 20 is a first-type document and FIG. 12B shows a case where the document on the platen glass 20 is a second-type document.

In cases where the document on the platen glass 20 is a first-type document, the intensity of the image signal of the first-type document obtained by the second operation with external light entering the document table 11 substantially equals the black reference data 32 in the central part in the main scanning direction while showing a tendency to increase in the edge parts in the main scanning direction as shown in FIG. 12A. The steps S62, S64 and S65 are executed successively on condition that the document on the platen glass 20 is judged to be a first-type document in the step S61. In other words, the control unit 55 executes the correction process only to the lighting period image signals corresponding to the edge parts of the document in the main scanning direction (included in the lighting period image signal after the detection of the external light entering the document table 11) when the document on the platen glass 20 is judged to be a first-type document. Here, each of the "lighting period image signals corresponding to the edge parts" means an image signal (part of the one-line image signal corresponding to one line in the main scanning direction) within a prescribed range (prescribed number of pixels) of an edge. The "prescribed number of pixels" has previously been set as mentioned above. The correction process in this case is a process for modifying part of the white reference data 30 to be used for the shading correction. As shown in FIG. 12A, within the white reference data 30 corresponding to one line in the main scanning direction (solid curve), data regarding the edge parts (right edge part & left edge part) in the main scanning direction are changed to the white reference data obtained by the step S64 (broken curves). Meanwhile, the white reference data 30 regarding the central part in the main scanning direction is directly used for the shading correction without being modified.

On the other hand, in cases where the document on the platen glass 20 is a second-type document, the intensity of the image signal of the second-type document obtained by the second operation with external light entering the document table 11 is higher than the black reference data 32 in the central part in the main scanning direction while showing a tendency to increase in the edge parts in the main scanning direction (due to the effect of external light entering the document table 11 through the areas at both edges of the document in the main scanning direction) as shown in FIG. 12B. Therefore, the whole lighting period image signal (obtained by the first operation after the detection of external light) is affected by the external light. The steps S63, S64 and S65 are executed successively on condition that the document on the platen glass 20 is judged not to be a first-type document in the step S61. In other words, the control unit 55 executes the correction process to the whole lighting period image signal after the detection of external light (corresponding to the whole range of the document in the main scanning direction) when the document on the platen glass 20 is judged not to be a first-type document. The correction process in this case is a process for modifying all the white reference data 30 to be used for the shading correction. As shown in FIG. 12B, all the white reference data 30 corresponding to one line in the main scanning direction (solid curve) is changed to the white reference data obtained by the step S64 (broken curve).

In this embodiment, the non-lighting period image signal obtained by the second operation is processed (corrected, etc.) by the circuits 69-73 and thereafter used at least for the external light detection (S57). Therefore, the first operations are continued until external light is judged to have entered the document table 11 based on the non-lighting period image signal obtained by the second operation. The lighting period image signal obtained by the first operation, as an image signal affected by external light (which had been outputted from the CIS 40 at the point when the external light was detected), is stored in the RAM 58 without undergoing the removal of the effect of the external light. Thus, in order to remove the effect of the external light from this lighting period image signal, the first operation has to be reexecuted from the point (scanning position) where the entrance of external light was detected (where the judgment of S57 was YES).

After finishing the modification of the white reference data 30 to be used by the shading correction circuit 71 (S65), the control unit 55 moves back the scanning position by a prescribed number of lines (S66). Specifically, the control unit 55 rotates the carriage motor 65 in a reverse direction to move the carriage 41 in a backward direction (opposite to the traveling direction of the carriage 41 for the document scanning (forward direction)) by the prescribed number of lines. The "prescribed number of lines" has been preset properly (so that the scanning position can be sufficiently moved back across the scanning position (scan line) corresponding to the non-lighting period image signal in which the external light was detected) and stored in the EEPROM 59. The setting of the "prescribed number of lines" is made based on data processing speed of the control unit 55, etc, and the traveling speed of the carriage 41. After moving back the scanning position as above, the control unit 55 restarts moving the carriage 41 in the forward direction by rotating the carriage motor 65 in the normal direction (S67).

After restarting the movement of the carriage 41, the control unit 55 judges whether the scanning position of the CIS 40 has reached the external light detecting position or not (S68). This "external light detecting position" means a scanning position corresponding to the external light detecting position acquired in S60. The judgment of S68 is made by monitoring the number of driving pulses supplied to the carriage motor 65, for example. When the scanning position has not reached the external light detecting position (S68: NO), the control unit 55 returns to the step S68 while continuing the movement of the carriage 41. When the scanning position has reached the external light detecting position (S68: YES), the control unit 55 returns to the step S55, by which the first and second operations are restarted from the scanning position for the second operation where the external light was detected.

Incidentally, in the case where external light was detected during the document scanning, the white reference data 30 has already been modified by the step S65 during the interruption of the document scanning operation. The lighting period image signal obtained by the first operation after the restart of the document scanning is corrected by the shading correction circuit 71 (shading correction) based on the modified white reference data. After the white reference data is modified, the image signal obtained by the first operation or the second operation has distribution in which effect of the external light is eliminated.

As above, when external light is judged to have entered the document table 11, the control unit 55 interrupts the first operations of the CIS 40, moves back the document scanning position by the prescribed number of lines (i.e., to the external light detecting position), and restarts the first operations of the CIS 40. Part or all of the white reference data 30 acquired in the step S52 is overwritten with the new white reference data obtained in the step S64. The lighting period image signal outputted by the CIS 40 after the detection of the external light is corrected (shading correction) based on the modified white reference data. This shading correction of the lighting period image signal by use of the white reference data 30 modified by the control unit 55 corresponds to the aforementioned "correction process" for removing the effect of external light from the lighting period image signal outputted by the CIS 40 as the result of the first operation after the detection of the external light entering the document table 11. In other words, the correction process in this embodiment is a process for modifying the white reference data 30 stored in the RAM 58 based on the non-lighting period image signal outputted by the CIS 40 as the result of the second operation in which external light is judged to have entered the document table 11.

Figure 13:
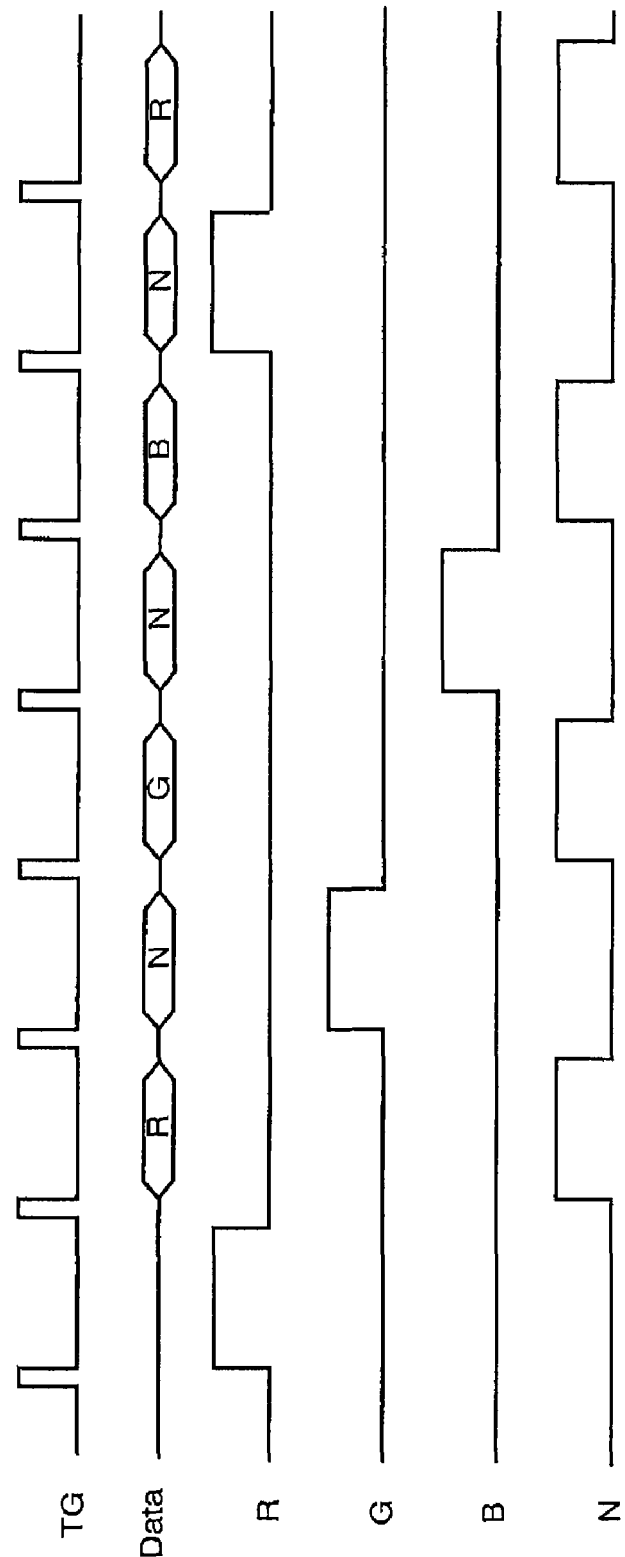
FIG. 13 is a timing chart showing a modification of the document scanning operation performed by the CIS.

FIG. 13 is a timing chart showing a modification of the document scanning operation performed by the CIS 40. As shown in FIG. 13, the CIS 40 may also be configured to execute the document scanning operation by alternately performing a first operation for projecting light of one of the three colors (R, G, B) from the light source 42 onto the document and outputting a scanned document image as a one-line image signal and a second operation for outputting a scanned document image as a one-line image signal in the OFF state of the light source 42.

As described above, in the scanner 10 in accordance with the embodiment of the present invention, the second operation, for outputting a scanned document image as an image signal in the OFF state (non-lighting period) of the light source 42, is performed in prescribed intervals between the first operations which are performed as regular scanning operations. Based on the non-lighting period image signal obtained by the second operation, whether the document on the platen glass 20 is a first-type document (not letting through light) or not is judged. In other words, the type of the document in regard to the transmission of light through the document or the status of external light entering the document table 11 is judged (detected) based on the non-lighting period image signal. The correction process for removing the effect of external light from the lighting period image signal obtained by the first operation can be executed properly by carrying out the correction process depending on the result of the judgment as explained above.

While a description has been given above of a preferred embodiment in accordance with the present invention, the present invention is not to be restricted by the particular illustrative embodiment and a variety of modifications, design changes, etc. are possible without departing from the scope and spirit of the present invention described in the appended claims.

For example, the method for the judgment on whether the document on the platen glass 20 is a first-type document or not is not restricted to the one described in the above embodiment. For instance, the second signal level (higher than the first signal level in the above embodiment) may also be set equal to the first signal level. The judgment on whether the document on the platen glass 20 is a first-type document or not may be made on condition that external light is judged to have entered the document table 11, based on whether the intensity of the non-lighting period image signal corresponding to the central part of the document in the main scanning direction is less than the first signal level or not. In short, the document judgment may also be made by use of the first signal level only, without using the second signal level (see FIG. 11).

While the judgment on whether the document on the platen glass 20 is a first-type document or not is made on condition that external light is detected inside the document table 11 in the above embodiment, the document judgment may also be made irrespective of whether external light is detected or not.

While external light is judged to have been detected inside the document table 11 on condition that the intensity of the non-lighting period image signal outputted by the CIS 40 as the result of the second operation exceeds the third signal level in the above embodiment, the condition of the judgment may be changed. For example, it is possible to judge that external light has been detected inside the document table 11 on condition that the average of the intensity of the non-lighting period image signal for one line in the main scanning direction exceeds a third signal level.

While the external light detection is executed in the above embodiment on condition that no document is detected by the document sensor 36 in the feed tray 22, the condition for the external light detection may be changed. For example, the external light detection may be executed on condition that a document on the platen glass 20 is detected by the CIS 40.

While the external light detection is executed in the above embodiment on condition that the opened position of the document cover 17 is detected by the open/close switch 24, the condition for the external light detection may be changed. For example, the external light detection may be executed irrespective of whether the document cover 17 is in the opened position or in the closed position.

While the correction process in the above embodiment has been described as a process for modifying the white reference data 30 to be used for the shading correction, the correction process may be carried out in different ways. For example, the correction process may also be configured to remove the effect of external light from the lighting period image signal by subtracting the output value of the non-lighting period image signal from that of the lighting period image signal.

The process executed when external light is judged to have entered the document table 11 is not restricted to the correction process described in the above embodiment. For example, a notification process for displaying information indicating the entrance of external light on the liquid crystal display of the operation panel 13 may be executed instead of the correction process (or the document scanning operation may be stopped) when external light is judged to have entered the document table 11. The scanner 10 may also be configured to let the user select whether to restart or stop the document scanning operation through the operation panel 13 after notifying the user of the entrance of external light.

While the judgment on whether external light has entered the document table 11 or not is made based on the non-lighting period image signal after being processed by the circuits 69-73 in the above embodiment, the timing of the judgment process is not restricted to that in the embodiment. For example, the judgment process may be carried out based on the analog non-lighting period image signal from the CIS 40 before being inputted to the AFE circuit 69. The judgment process may also be carried out based on the digital non-lighting period image signal outputted from the AFE circuit 69.

While the CIS (Contact Image Sensor) 40 is employed as a scanning unit (for scanning the image on a document) in the above embodiment, scanning units of other types may also be used as long as the scanning unit is capable of projecting light from a light source onto a document placed on a transparent plate and scanning the image on the document line by line.

What is claimed is:

1. An image scanning device for scanning an image on a document, comprising:
   a document table on which a document to be scanned is placed;
   a scanning unit comprising a light source and configured to scan an image on the document by projecting light from the light source onto the document in a time-sharing manner and to detect reflected light from the document, wherein the scanning unit is configured to obtain a first image signal of the document when the light source projects light onto the document and to obtain a second image signal of the document when the light source does not project light onto the document;
   a moving unit which moves at least one of the document and the scanning unit such that they move relative to each other; and
   a document-type judgment unit which judges the type of the document based on the second image signal of the document obtained, when the light source does not project light onto the document, by the scanning unit.

2. The image scanning device according to claim 1, wherein:
   the light source includes multiple light emitting elements for emitting light of different colors; and
   the scanning unit projects light onto the document in the time-sharing manner by successively lighting the light emitting elements.

3. The image scanning device according to claim 1, wherein the document-type judgment unit judges that the document is a first-type document when the intensity of the second image signal corresponding to a central part of the document in the main scanning direction is less than a first signal level and the intensity of the second image signal corresponding to both edge parts in the main scanning direction exceeds a second signal level.

4. The image scanning device according to claim 1, wherein the document-type judgment unit judges the type of the document based on distribution of a signal level of the second image signal.

5. The image scanning device according to claim 1, further comprising an external light detecting unit which detects external light entering the document table based on the second image signal,
wherein the document-type judgment unit judges the document type when the external light is detected by the external light detecting unit.

6. The image scanning device according to claim 5, wherein the external light detecting unit is judged to have detected the external light if the intensity of the second image signal exceeds a third signal level.

7. The image scanning device according to claim 5, further comprising a document cover which can be opened and closed freely with respect to the document table, wherein:
the document cover includes a document tray on which a document to be fed to the scanning unit can be placed, a component of the moving unit which feeds the document from the document tray along a feeding path to let the document pass through a prescribed scanning position where the scanning unit is placed, and a first sensor which detects whether a document exists on the document tray or not; and
the external light detecting unit starts the detection of external light when the first sensor detects that no document exists on the document tray.

8. The image scanning device according to claim 7, further comprising a second sensor which detects whether the document cover is in an opened position or in a closed position, wherein the external light detecting unit starts the detection of external light when the second sensor detects that the document cover is in the opened position.

9. The image scanning device according to claim 5, further comprising a first correction unit which executes a correction process, for removing effect of the external light from the first image signal which is obtained by the scanning unit by scanning the document when the light source projects light onto the document, wherein the correction process is based on the document type judged by the document-type judgment unit.

10. The image scanning device according to claim 9, wherein the first correction unit executes the correction process to a portion of the first image signal corresponding to both edge parts of the document in the main scanning direction when the document is judged to be a first-type document, which is opaque.

11. The image scanning device according to claim 9, wherein the first correction unit executes the correction process to the first image signal corresponding to the whole range of the document in the main scanning direction when the document is judged not to be a first-type document, which is opaque.

12. The image scanning device according to claim 9, further comprising a second correction unit which executes shading correction to the first image signal,
wherein the first correction unit executes the correction process by modifying white reference data to be used for the shading correction.

13. The image scanning device according to claim 1, wherein the image scanning device is configured to selectively operate in a first mode in which the scanning unit scans the document only when the light source projects light onto the document and in a second mode in which the scanning unit scans the document both when the light source projects light onto the document and when the light source does not project light onto the document.

14. A method of detecting a type of a document, comprising the steps of:
controlling a light source and a scanner to obtain an image signal representing a scanned image of a document;
obtaining a first image signal of the document by scanning the document when the light source projects light onto the document;
obtaining a second image signal of the document by scanning the document when the light source does not project light onto the document;
judging the type of the document by detecting transparency of the document based on the second image signal obtained when the light source does not project light onto the document.

15. An image scanning device for scanning an image on a document, comprising:
a document table on which a document to be scanned is placed;
a scanning unit comprising a light source and configured to scan an image on the document by projecting light from the light source onto the document and to detect reflected light from the document, wherein the scanning unit is further configured to obtain a first image signal of the document when the light source projects light onto the document and to obtain a second image signal of the document when the light source does not project light onto the document;
a moving unit which moves at least one of the document and the scanning unit such that they move relative to each other;
a document-type judgment unit which judges the type of the document based on the second image signal of the document obtained, when the light source does not project light onto the document, by the scanning unit; and
a first correction unit which controls a correction process for removing effect of external light from the first image signal in accordance with the second image signal.

16. The image scanning device according to claim 15, wherein the first correction unit controls the correction process based on distribution of a signal level of the second image signal.

17. The image scanning device according to claim 15, wherein the first correction unit controls the correction process according to whether a predetermined condition that the intensity of the second image signal corresponding to a central part of the document in the main scanning direction is less than a first signal level and the intensity of the second image signal corresponding to both edge parts in the main scanning direction exceeds a second signal level is satisfied.

18. The image scanning device according to claim 17, wherein the first correction unit executes the correction process to the first image signal corresponding to both edge parts of the document in the main scanning direction when the predetermined condition is satisfied.

19. The image scanning device according to claim 17, wherein the first correction unit executes the correction process to the first image signal corresponding to the whole range of the document in the main scanning direction when the predetermined condition is not satisfied.

20. The image scanning device according to claim 15, further comprising a second correction unit which executes shading correction to the first image signal, wherein the first correction unit executes the correction process by modifying white reference data to be used for the shading correction.

* * * * *